United States Patent
Bucher et al.

(10) Patent No.: US 8,418,398 B2
(45) Date of Patent: *Apr. 16, 2013

(54) ELECTROCUTING MOUSE TRAP WITH AUTOMATIC CHAMBER-CLEARING MECHANISM

(75) Inventors: Alan Weir Bucher, Manheim, PA (US); Richard L. Eyer, Lititz, PA (US); Marko Konstantin Lubic, Shillington, PA (US); Troy A. Wetzel, West Reading, PA (US); Robert T. Cruz, Lititz, PA (US)

(73) Assignee: Woodstream Corporation, Lititz, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/435,941

(22) Filed: Mar. 30, 2012

(65) Prior Publication Data

US 2012/0240450 A1    Sep. 27, 2012

Related U.S. Application Data

(63) Continuation of application No. 12/213,382, filed on Jun. 18, 2008, now Pat. No. 8,151,541.

(51) Int. Cl.
*A01M 19/00* (2006.01)
*A01M 23/38* (2006.01)

(52) U.S. Cl.
USPC .......................................................... 43/99

(58) Field of Classification Search ................. 43/98, 99
See application file for complete search history.

(56) References Cited

U.S. PATENT DOCUMENTS

| | | | |
|---|---|---|---|
| 1,047,682 A | 12/1912 | Morawski |
| 1,063,715 A | 6/1913 | McCue |
| 1,074,770 A | 10/1913 | Beardsley |
| 1,115,695 A | 11/1914 | Leyson |
| 1,738,623 A | 12/1929 | Westerlund |
| 2,398,188 A | 4/1946 | Meehan |
| 2,472,806 A | 6/1949 | Burns |
| 2,218,403 A | 10/1949 | McKee |
| 2,519,783 A | 8/1950 | Nagl |
| 2,677,209 A | 5/1954 | Hutchison, Sr. |
| 3,007,277 A | 11/1961 | Anderson |
| 6,735,899 B1 | 5/2004 | Anderson et al. |
| 6,796,081 B2 | 9/2004 | Anderson et al. |
| 6,836,999 B2 | 1/2005 | Rich et al. |
| 7,010,882 B2 | 3/2006 | Rich et al. |
| 7,219,466 B2 | 5/2007 | Rich et al. |
| 2009/0192763 A1 | 7/2009 | Gardner et al. |
| 2009/0223112 A1 | 9/2009 | Deibert |

FOREIGN PATENT DOCUMENTS

WO    WO 9200671    1/1992

*Primary Examiner* — Son T Nguyen
(74) *Attorney, Agent, or Firm* — Jacobson Holman PLLC

(57) ABSTRACT

An electronic mouse trap is provided having multiple kill and automatic killing chamber clearing capabilities. The trap includes an elevated killing chamber rotatably mounted on a base that houses a collection bin positioned under the chamber and which has an entrance pathway that provides mice with access to the chamber. Upon completion of a killing cycle and the killing of a mouse, the chamber is automatically rotated by a gear motor about a longitudinal axis that is slightly below the floor of the chamber. The chamber rotates approximately 180 degrees so as to be inverted, allowing the dead mouse to fall downwardly into the collection bin. Once the chamber has been inverted and the mouse removed by gravity, the gear motor reverses the rotation direction and returns the chamber to its upright position where it is ready to reinitiate the killing cycle for another mouse.

17 Claims, 25 Drawing Sheets

ELECTROCUTING MOUSE TRAP WITH AUTOMATIC CHAMBER-CLEARING MECHANISM

This is a continuation application of U.S. application Ser. No. 12/213,382, filed Jun. 18, 2008, which issues as U.S. Pat. No. 8,151,514 on Apr. 10, 2012, the priority of which is hereby claimed.

BACKGROUND OF THE INVENTION

1. Field of the Invention

The present invention is related to the field of rodent control and, more particularly, to an electronic mouse trap for electrocuting and collecting a plurality of mice between trap service events.

2. Description of the Related Art

Electronic mouse traps of various designs have been used effectively to catch and dispatch mice, usually on a single kill cycle basis after which the trap must be manually reset. If the mouse escaped during the kill cycle, the killing opportunity can be lost and the trap is rendered inactive pending service by the user. One trap that is capable of automatically rearming in the event of mouse escape is set forth in U.S. Pat. No. 6,836,999 ("the '999 patent"), the disclosure of which is hereby incorporated by reference in its entirety as if fully set forth herein.

Even with automatic rearming so that, in the event of mouse escape, multiple killing opportunities are possible, once a mouse is killed the trap enters a standby mode and must be manually reset, and the dead mouse must be removed before the trap can reinitiate the killing cycle process. Therefore, only one mouse can be dispatched before trap servicing is required. As a result, the trap may sit in the standby mode for an extended period if trap status is not monitored regularly, resulting in an inefficiency in total mouse kills as compared with possible kill opportunities present in a target rich area.

SUMMARY OF THE INVENTION

In view of the foregoing, one object of the present invention is to overcome the difficulties of monitoring the status of an electronic mouse trap on a timely basis so that the trap can be automatically emptied and reset with minimal trap down time.

Another object of the present invention is to provide an electronic mouse trap having automatic rearming capability that is able to kill and retain a plurality of mice before trap servicing is required.

Yet another object of the present invention is to provide an electronic mouse trap having a killing chamber emptying capability that opens the chamber for the next mouse and minimizes the risk of chamber fouling that might discourage subsequent mice from entering the chamber.

A further object of the present invention is to provide an electronic mouse trap having a rotating killing chamber that inverts to empty each electrocuted mouse as soon as it is killed, reducing the energy needed to empty the chamber and ensuring reliable and cost-effective operation.

A still further object of the present invention is to provide an electronic mouse trap that allows for easy mouse carcass removal from a collection bin as well as ready access to the killing chamber for cleaning thereof when servicing is performed.

Yet another object of the present invention is to provide an electronic mouse trap that is not complex in structure and which can be manufactured at low cost but yet efficiently kills and contains multiple mice without requiring user intervention.

Still another object of the present invention is to provide an electronic mouse trap that is simple and safe to operate with a compact size that is suitable for a wide range of mouse trapping environments and also readily approachable by mice in these environments.

In accordance with these and other objects, the present invention is directed to an electronic mouse trap that is capable of effecting multiple kills and of clearing the killing chamber between kills so that a plurality of dead mice can be accumulated before trap servicing is required. The trap includes an elevated killing chamber rotatably mounted on a base that houses a collection bin located below the killing chamber. The trap also includes an entrance pathway that provides mice with access to the killing chamber. The chamber is provided with a plurality of killing plates and is operative generally in the manner set forth in the '999 patent previously incorporated herein by reference.

According to the present invention, upon completion of the kill cycle, the killing chamber is rotated by a power-driven rotating assembly, preferably embodied as a gear motor, about a longitudinal axis that is slightly below the floor of the chamber. The chamber rotates approximately 180 degrees so as to be inverted, allowing the dead mouse to fall downwardly by gravity into the collection bin. Once the chamber has been inverted and the mouse removed by gravity, the power-driven rotating assembly reverses the rotation direction and returns the chamber to its upright position where it is ready for the next mouse.

The foregoing objects and advantages of the present invention, which will become subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
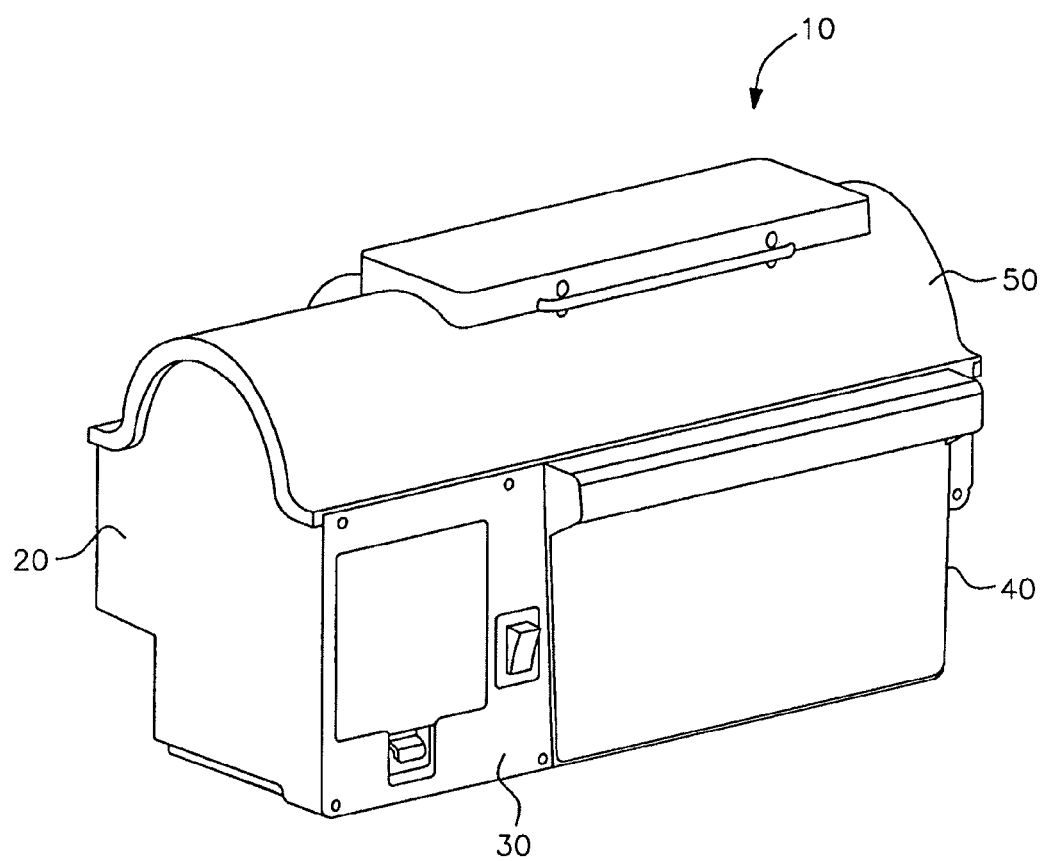
FIG. 1 shows a front perspective view of an electrocuting mouse trap with turnover chamber-clearing mechanism in accordance with the present invention.

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

As illustrated in FIGS. 1-4, the present invention is directed to an electronic trap for electrocuting and collecting multiple mice, the trap generally designated by the reference numeral 10. The trap 10 includes a base 20, a power source assembly 30, a collecting bin 40, a roof assembly 50, a killing chamber assembly 60, a power-driven rotating assembly 70, a home switch 80, a dump switch 160, a bin-in-place safety switch 180, and a wire guide 90.

Figure 2:
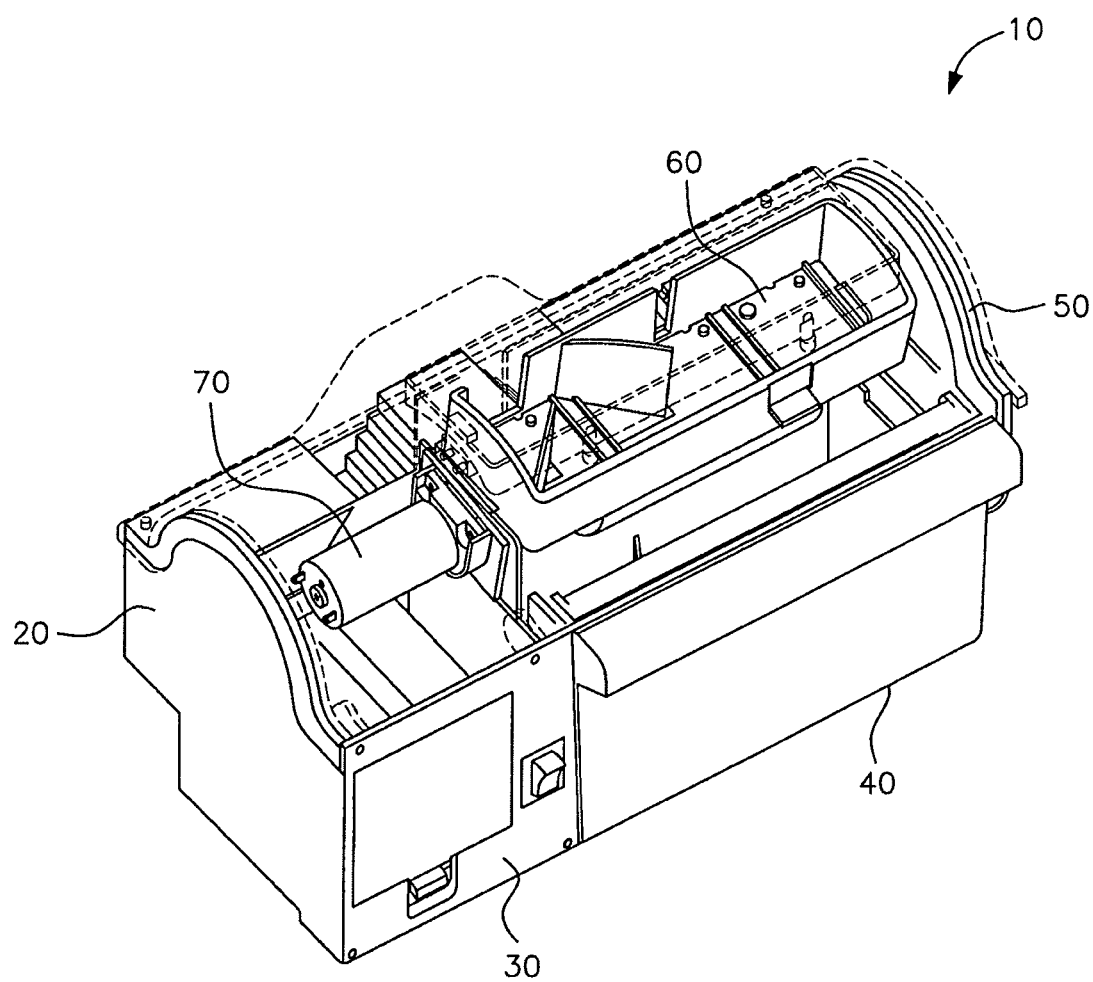
FIG. 2 is a top perspective view of the trap of FIG. 1, shown with a transparent roof to reveal the underlying components.
Figure 3:
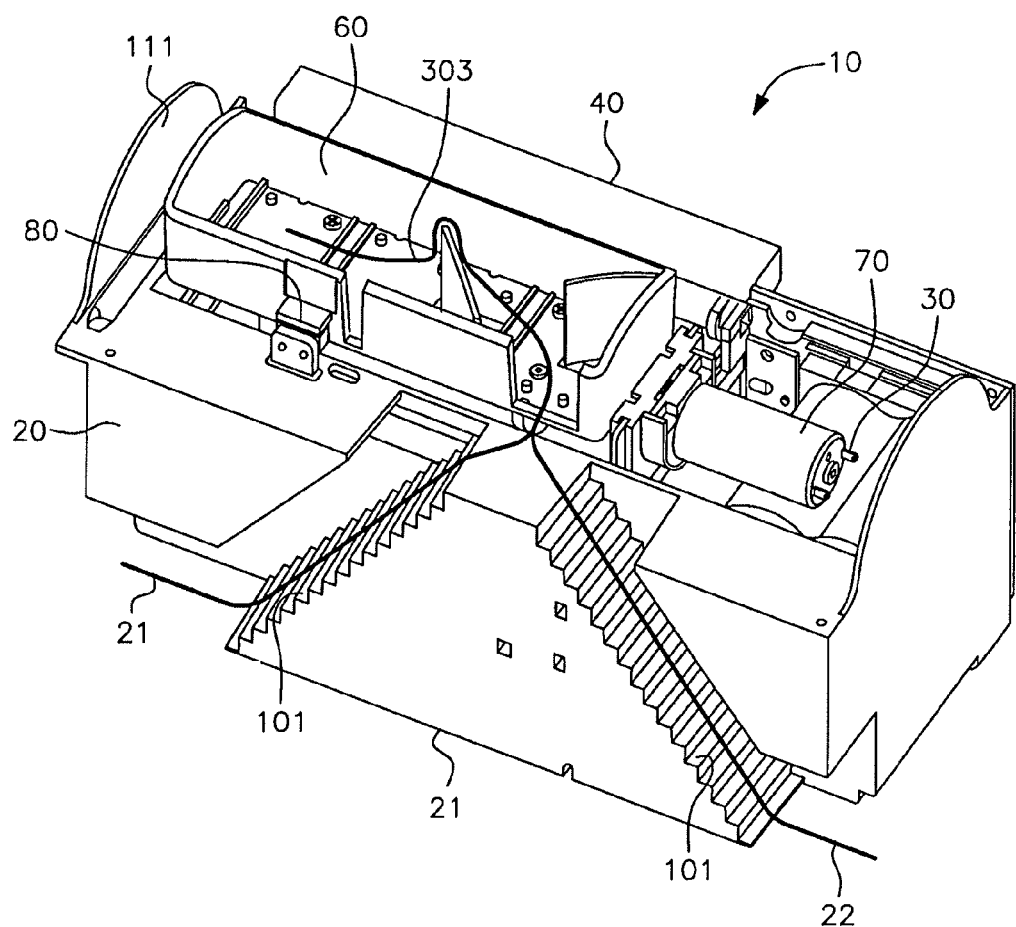
FIG. 3 is a perspective view of the back side of the trap of FIG. 1, without the roof, and indicating the mouse entry pathways provided on the base.
Figure 4:
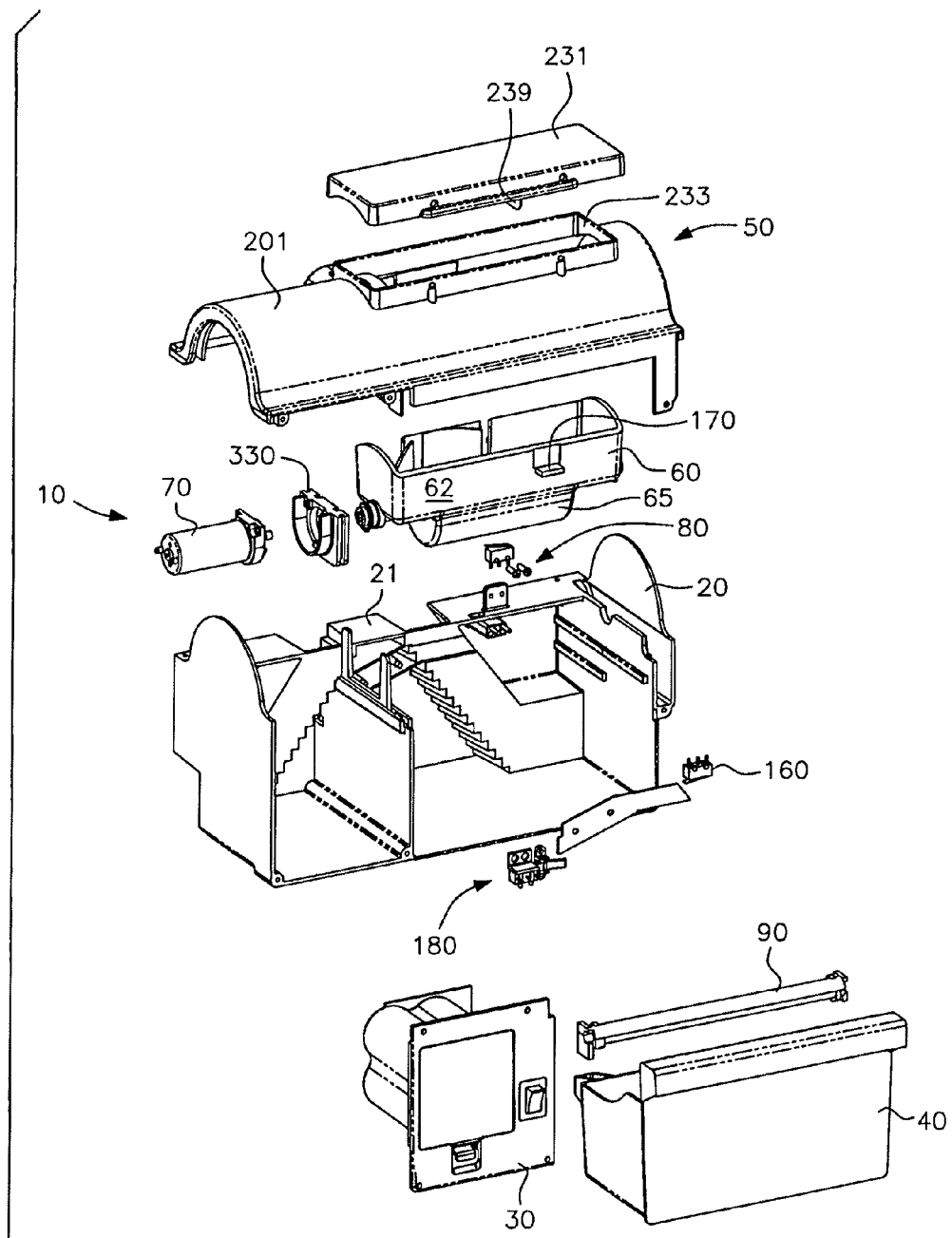
FIG. 4 is an exploded schematic view of the components of the trap of FIG. 1.

Perspective front and top views of the trap in an assembled, operational condition are provided in FIGS. 1 and 2, with the roof being transparent in FIG. 2 for the purpose of showing the underlying parts; such transparency is not part of the actual trap. FIG. 3 presents a perspective view of the rear side of the trap, without the roof. The trap components are shown in exploded view in FIG. 4.

Figure 5:
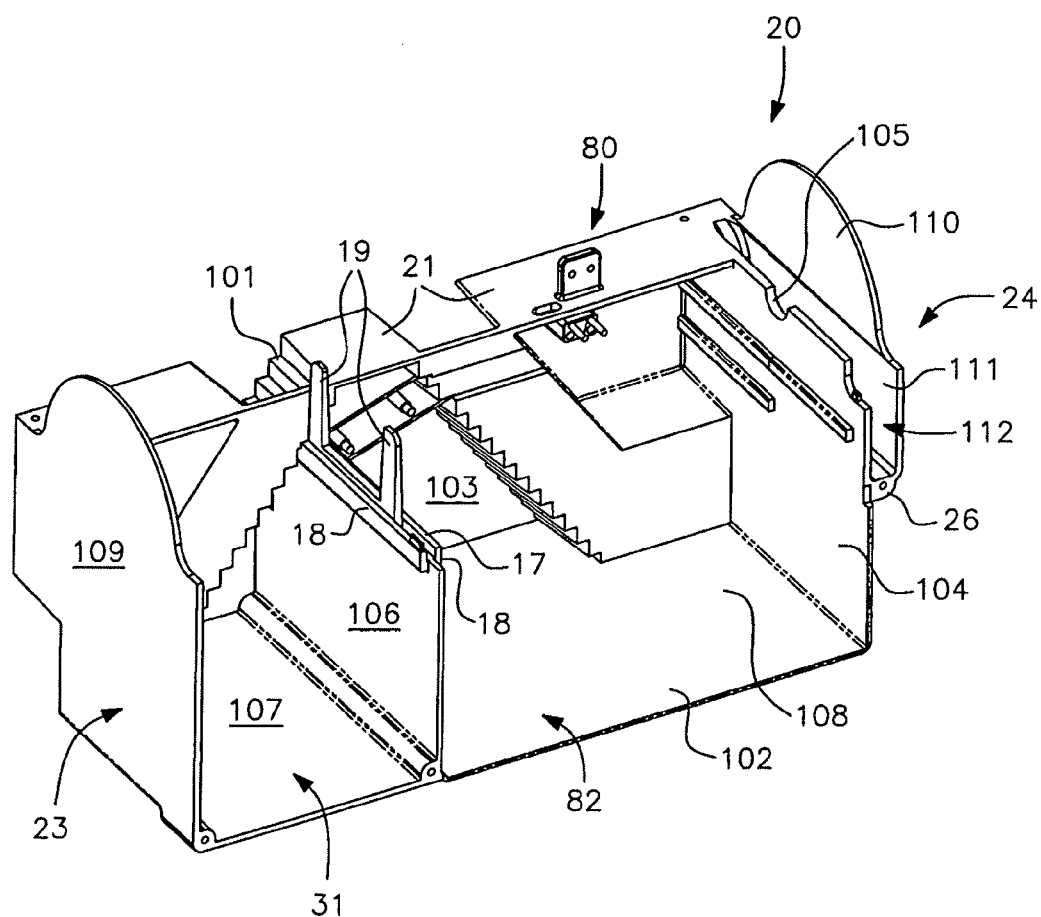
FIG. 5 is an enlarged view of the base shown in FIG. 4.

The base 20 shown in FIG. 5 includes a substantially horizontal floor 102 with a rear wall 103 extending vertically therefrom, parallel to the long axis of the base 20. Inclined stairs 101, which provide pathways 22 for a mouse to reach the killing chamber assembly 60, are preferably formed into the rear wall 103. According to a preferred embodiment, two sets of stairs 101 extend from the top 21 of the base 20 to opposite sides of the rear wall 103 of the base so that mice can begin ascending from either side. In this way, the trap 10 can be positioned with its rear side up against a building or other wall such that mice running along the wall from either side will naturally be inclined to proceed upwardly when faced with the stairs and move toward the entrance to the chamber. An inclined ramp or other structure known to be readily traversable by mice could also be used in place of the stairs.

The top 21 of the base also supports the home switch 80. The home switch 80, along with the dump switch 160, functions to provide input to the power-driven rotating assembly 70 regarding the orientation of the killing chamber assembly 60 as between the home and dump positions, as will be discussed hereinafter.

Figure 6:
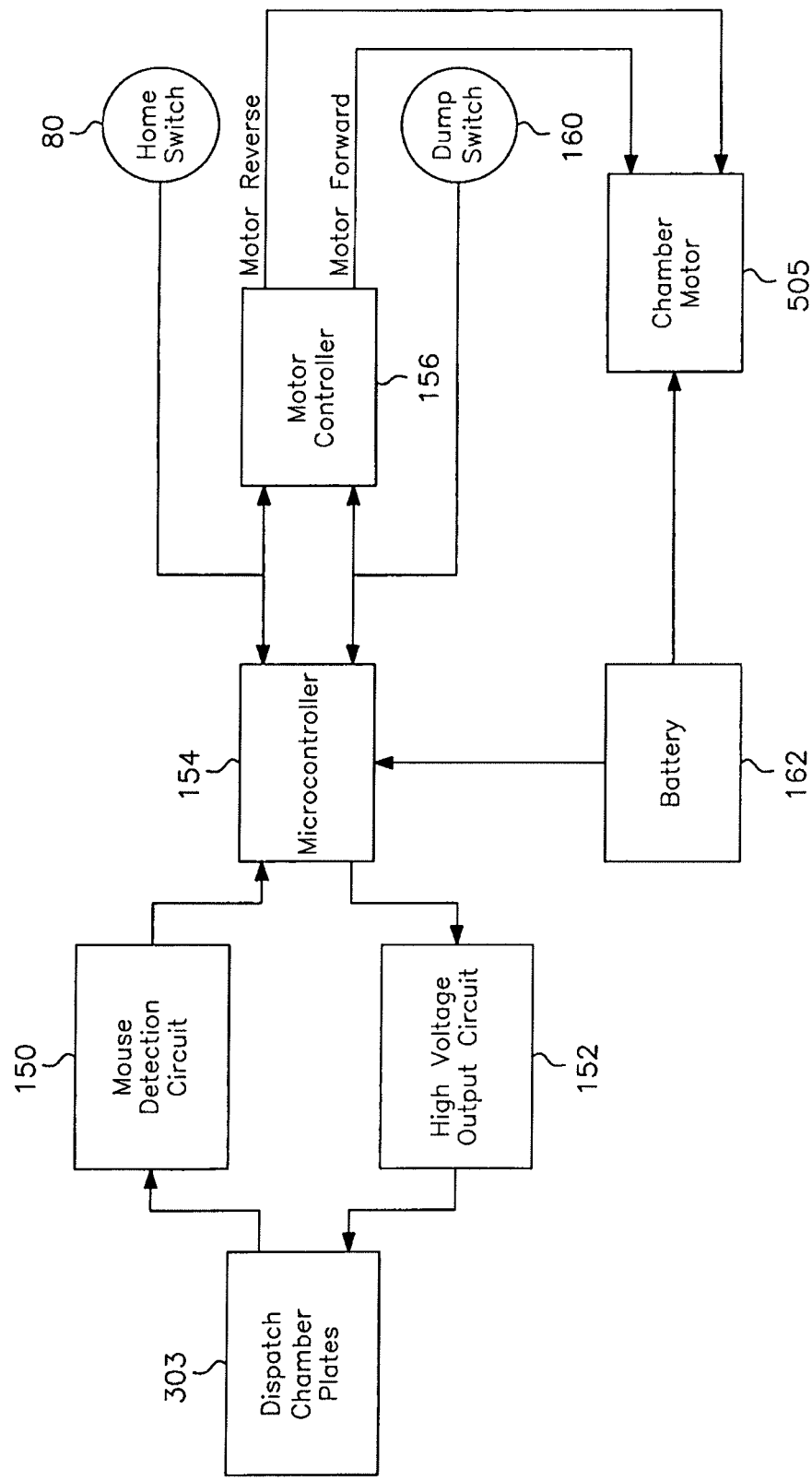
FIG. 6 is a block diagram of a multikill circuit in accordance with the present invention.

The base 20 also includes a collecting bin area 108 and an electronics and motor area 107 that houses the circuit board, shown at a functional level in the block diagram of FIG. 6. The circuit board includes a mouse detection circuit 150, a high voltage output circuit 152, a microcontroller 154, and a motor controller 156 coupled to the home switch 80 and dump switch 160. A detailed schematic view of these components is set forth in FIGS. 7A and 7B. The electronics and motor area 107 also houses the motor 504, the power source assembly 30 including batteries 162, and other electronic components (not shown) of the trap.

The electronics and motor area 107 is separated from the bin area 108 by an internal vertical wall 106. The top 17 of the wall 106 has raised strips 18 on one side to receive and support the roof wall 204 described hereinafter. Extending upwardly from between the strips 18 and in spaced relationship with one another are two mounting arms 19 that are used to secure the power-driven rotating assembly 70, as will be described hereinafter.

A first side wall 109 spaced from the internal wall 106 provides the outer wall for the electronics and motor area 107 and defines a first end, generally designated by the reference numeral 23, of the base 20. A second side wall 104, spaced on the opposite side from the internal wall 106, defines the other side of the bin area and also the second end, generally designated by the reference numeral 24, of the base 20. The second side wall 104 contains a concave, half-cylindrical bearing surface 105 to accept a first tubular element 309 which defines a first end of the chamber's axis of rotation 308 (see FIG. 11). An elevated wall 110 spaced from and attached to the second side wall 104 by an elevated floor portion 26 defines a wire containment area 111 on said second end 24.

As just described, the electronics and motor area 107 is bounded on three sides by the rear wall 103, the first side wall 109 and the internal wall 106 of the base 20. To fully enclose the electronics and motor area, a front panel 401 (see FIG. 8) of the power source assembly 30 is fastened to the base 20 to cover the open side generally designated by the reference numeral 31 of the electronics and motor area 107.

Figure 8:
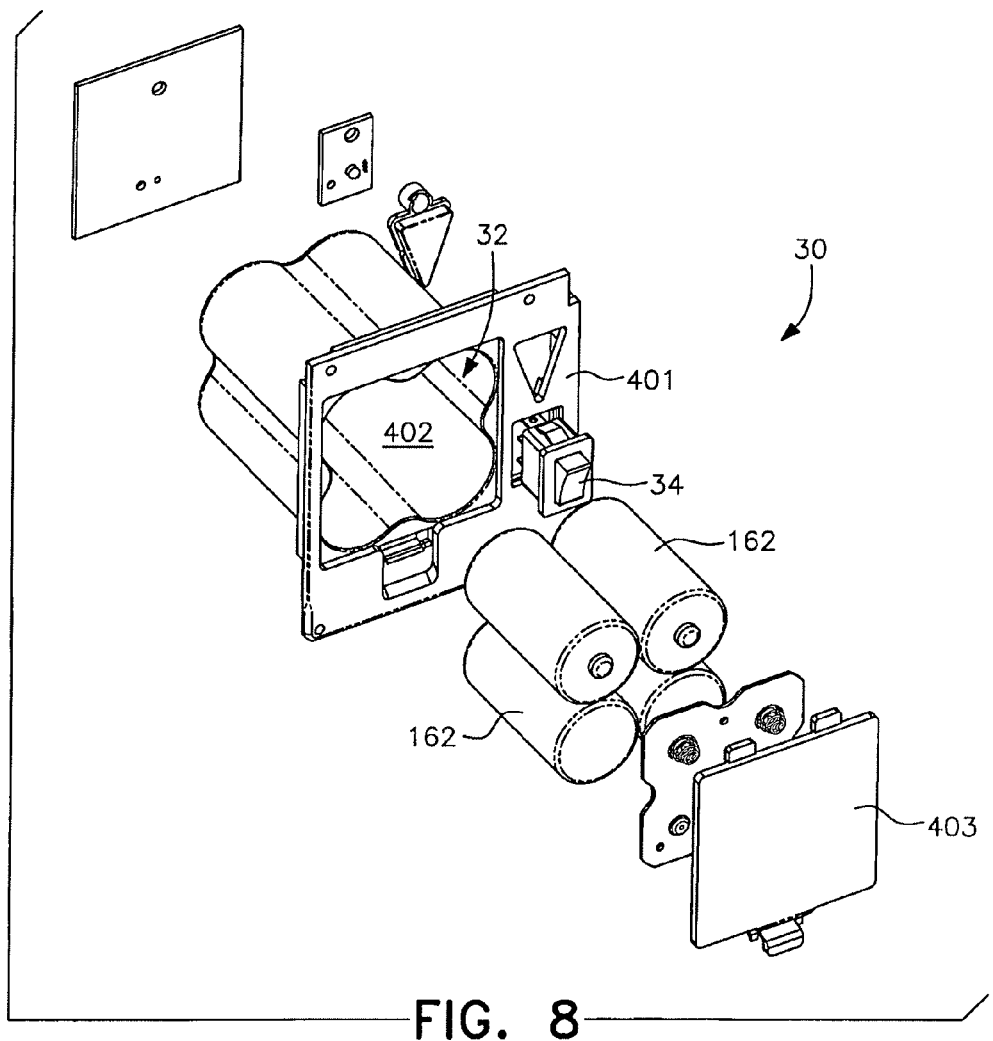
FIG. 8 is an enlarged exploded view of the power source assembly shown in FIG. 4.

As shown in FIG. 8, the power source assembly 30 preferably includes a compartment 402 for batteries 162 with an open side generally designated by the reference numeral 32 facing the front of the trap for access by the user. The open side 32 of the battery compartment 402 is covered by a battery compartment cover 403 which is attached in a way that allows such cover 403 to be opened and reclosed by the user when the batteries 162 need to be replaced. User controls, such as an on/off switch 34, may also be included in the front panel 401. Alternately, the power source assembly could include a suitable DC transformer equipped with a conventional power cord for connection to a standard household wall power outlet.

Figure 9:
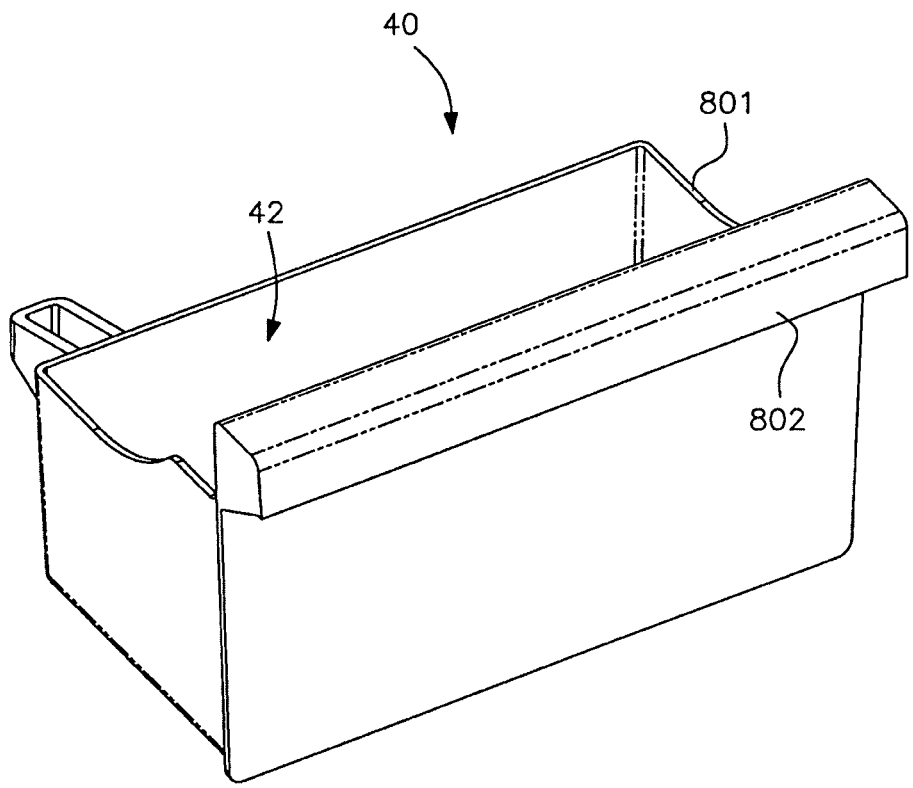
FIG. 9 is an enlarged view of the collection bin shown in FIG. 4.

Similarly to the electronics and motor area 107, the bin area 108 is bounded on three sides by the rear wall 103, the second side wall 104 and the internal wall 106 of the base 20. The open side generally designated by the reference numeral 82 of the bin area receives the collecting bin 40 which includes a bin 801 and a handle 802, as shown in FIG. 9. The collecting bin 40 is installed by sliding the bin 801 into the base 20 with the handle 802 exposed toward the front side of the trap and the open top 42 of the bin 801 facing the bottom of the chamber assembly 60. Through contact with the bin, the bin-in-place safety switch 180 is closed when the bin is fully inserted, enabling the trap to become active. When the bin is removed, the switch is opened, disabling the trap. The bin 801 is sized to be able to contain a plurality of mice, with various bins sizes being available to accommodate more or fewer carcasses between emptying events. According to one preferred embodiment, the bin is sized to contain about eight to ten house mouse carcasses.

Figure 10A:
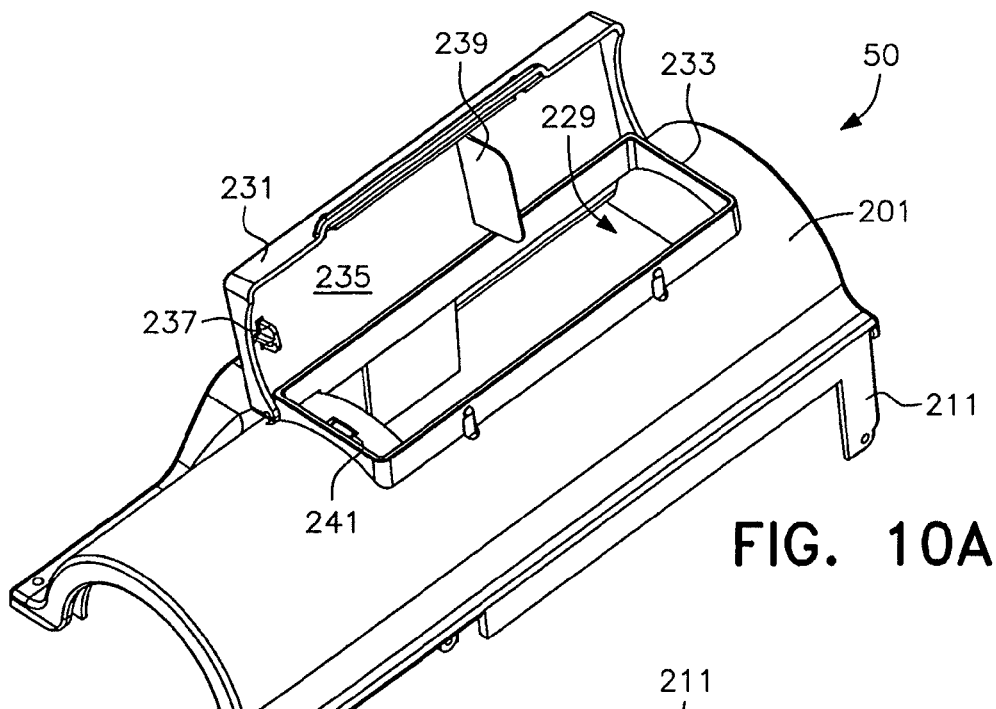
FIGS. 10A and 10B are enlarged perspective top and bottom views, respectively, of the roof assembly shown in FIG. 4.
Figure 11:
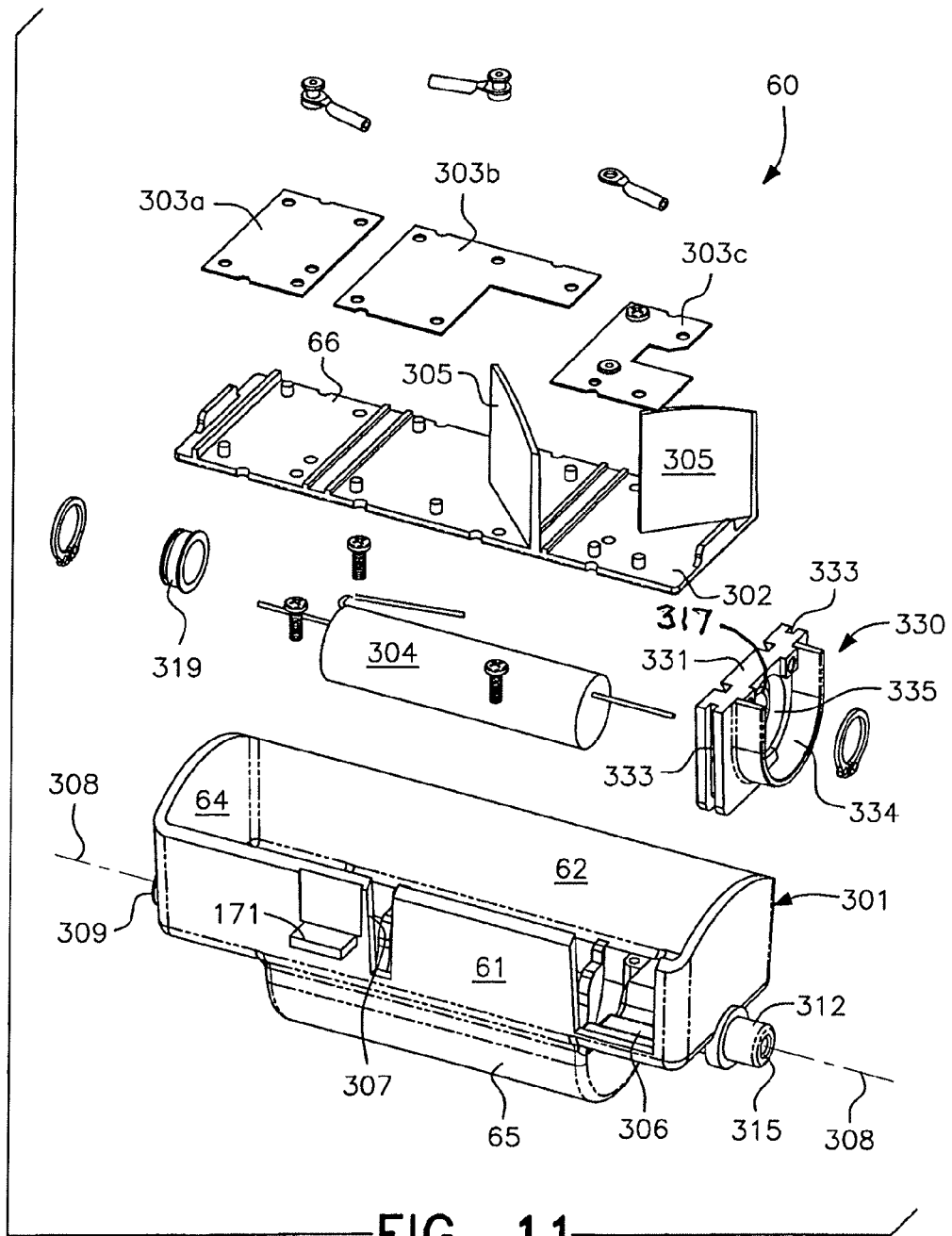
FIG. 11 is an enlarged exploded view of the assembly forming the killing chamber shown in FIG. 4, but shown in reverse.

The roof assembly 50 is attached to the base 20 with screws or other suitable fasteners and includes a substantially cylinder-shaped top 201 (see FIG. 10A) that conceals the killing chamber of assembly 60, thus protecting the user from contact with the electrocuting plates 303 positioned therein (see FIG. 11). An entranceway, generally designated by the reference numeral 209, on the rear side 52 of the top 201 mates with the top 21 of stairs 101 and entry opening 306 of the killing chamber assembly (described hereinafter) to provide access to incoming mice.

Figure 10B:
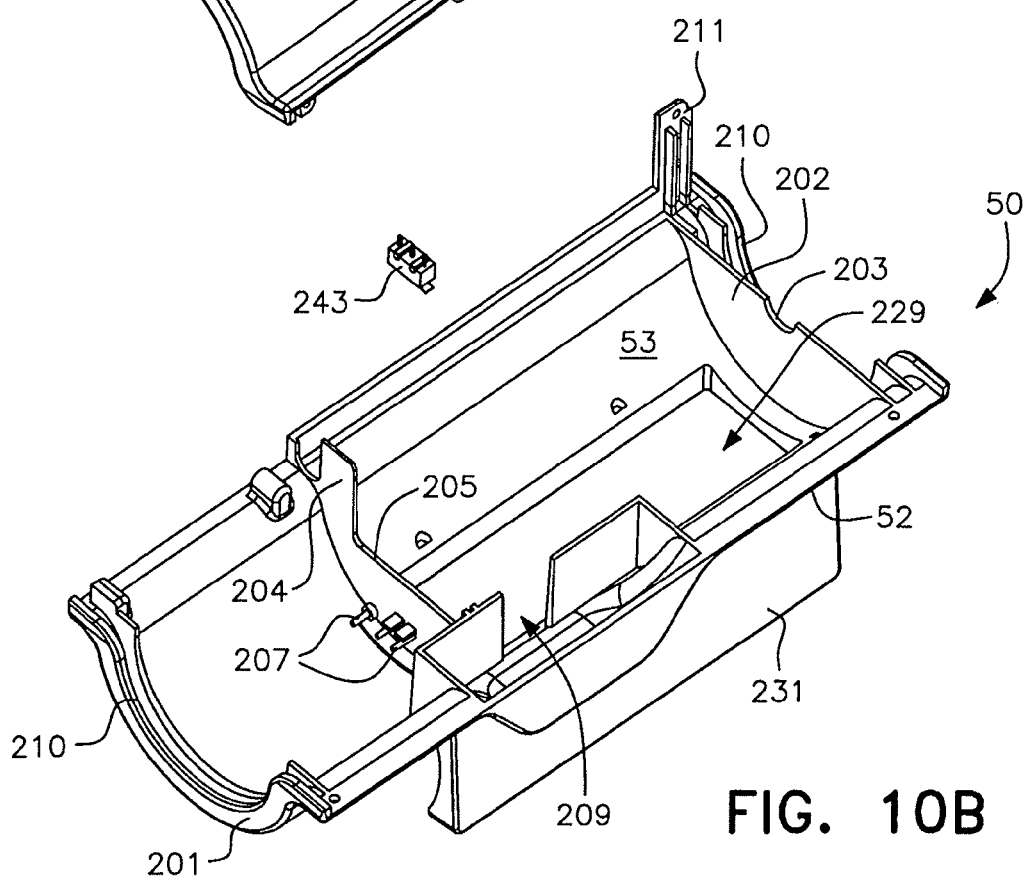

Extending perpendicularly from the inner surface 53 of the roof top 201 are two roof walls 202 and 204, as best shown in FIG. 10B. The first roof wall 202 contains a concave half-cylindrical bearing retention surface 203 that cooperates with base bearing surface 105 to form the first end of the chamber rotation axis 308 and, along with the second side wall 104 of the base, defines one end of the wire containment area 111. The second roof wall 204 has a flat bearing surface 205 that cooperates with a motor support bracket 330 (see FIG. 11) to capture the power-driven rotating assembly 70, as will be described hereinafter. The second roof wall 204 also supports a door safety switch 243 and, along with the inner vertical wall 106, defines the inner barrier of the electronics and motor area 107. The door safety switch 243 acts to enable and disable the power-driven rotating assembly 70, as will be described later.

Mating surfaces 210 are provided on each end of the roof top 201 to accept the rounded tops of side walls 109, 110 of the base 20. Projecting portion 211 extends perpendicularly to the floor 102 of the base 20 in a position to cover the open front, generally designated by the reference numeral 112, of the wire containment area 111 of the base, upon assembly of the roof assembly 50 to the base 20.

Access through the top 201 is provided by an opening, generally designated by the reference numeral 229, which is covered by a hinged door 231. The door 231 is supported on a generally rectangular base 233 that may be integrally formed with or mounted on the top 201. The underside 235 of the door 231 is provided with a prong 237 and a baffle 239 that project downwardly into the trap chamber. When the door 231 is closed, the prong 237 is received in an aperture 241 in the top 201 where the prong contacts and depresses an actuation lever 207. The actuation lever 207, when depressed, closes the door safety switch 243, enabling activation of the trap. When the door safety switch 243 is opened, i.e., when the door 231 is opened, the trap is disabled. The door 231 covers the opening 229 during use of the trap, but it can be opened to allow access to the interior when necessary for trap servicing.

The baffle 239 on the underside 235 of the door 231 serves as a half-wall located between the first and second roof walls 202, 204. The baffle 239 corresponds in function with the cover-mounted barrier 80 set forth in the '999 patent and has a similar purpose, namely to force the mouse to squeeze thereunder and thus come into contact with the electrocuting plates 303 when entering the enclosure 301. In the present invention, the baffle 239 is preferably formed as part of the roof assembly 50 so that it does not interfere with the free fall of the mouse carcasses from the chamber floor into the bin 801 when the chamber assembly 60 is inverted.

The chamber assembly 60 is shown in exploded view in FIG. 11 (as previously noted, FIG. 11 shows the killing chamber assembly 60 from the back side of the trap, as in FIG. 3). The chamber assembly 60 includes an enclosure, generally designated by the reference numeral 301, for receiving a mouse, a raised floor 302, electrocuting plates 303, a transformer 304 and associated wiring and fasteners (not all of which are shown), and a motor support bracket generally designated by the reference numeral 330.

The enclosure 301 includes first and second longitudinal walls 61, 62 joined at their ends to first and second lateral walls 63, 64, respectively. The longitudinal and lateral walls are substantially planar. The outer surface of wall 62 is provided with a dump position stop element 170 (see FIG. 4) that is operative with the dump switch 160 to provide input to the power-driven rotating assembly 70 when the killing chamber assembly 60 is in the full dump position. Similarly, the outer surface of the wall 61 has a home position stop element 171 that cooperates with the home switch 80 to provide input to the power-driven rotating assembly 70 when the killing chamber assembly 60 is in the home position.

The bottom of the enclosure is molded to include a half-cylindrical trough 65 that receives the transformer 304 therein. The raised floor 302 is fit between the lateral walls 63, 64 and the longitudinal walls 61, 62, extending perpendicularly thereto, and is fastened in the enclosure 301 so as to cover the trough 65 and the transformer 304 located therein, preventing the mouse from having any access to the wiring under the floor.

The electrocuting plates 303 are attached to an upper side 66 of the floor 302 so as to be contacted by the mouse after its entry and progress into the interior of the enclosure 301, and are electrically connected to the transformer 304 under the raised floor 302. According to a preferred embodiment, three electrocuting plates 303*a*, 303*b* and 303*c* are included, although only two can also be used, plates 303*a* and 303*b*. With the three-plate embodiment, the third plate 303*c* ensures that a live mouse does not end up in the collection bin in the event that two mice enter the trap close together. For example, in a two-plate configuration having plates 303*a* and 303*b*, a first mouse to enter can initiate the killing cycle while the second mouse, behind the first but adjacent the entrance 306, has not yet reached the two killing plates 303*a*, 303*b*. With the three-plate embodiment, the third plate 303*c* is connected through a diode D9 (see FIG. 7A) so the sensing function is blocked by the diode but the shock potential is still conducted to the third plate 303*c*. The high voltage output circuit 152 will not be triggered by the third plate 303*c*, however, so the first mouse has to travel to the far end of the chamber adjacent wall 64 before the trap is activated.

Extending upwardly from the floor 302 are baffles or barriers 305 that direct the mouse in the manner fully set forth in the '999 patent, previously incorporated herein by reference. Details of the electrical connections and operation are also set forth in the '999 patent and therefore will not be repeated fully here.

Entry opening 306 is formed in the first longitudinal wall 61 to allow the mouse to travel from the entranceway 209 of the roof assembly 50 into the enclosure 301. In addition, the first longitudinal wall 61 has a slot 307 formed therein that aligns with the baffle 239 in the roof assembly 50 when the trap is assembled, thus allowing the chamber assembly 60 to rotate without interference from the baffle 239.

The enclosure 301 has first and second substantially tubular elements 309, 312 at opposite ends of the enclosure that define the chamber assembly's longitudinal axis of rotation 308 which is located a short distance below the raised floor 302. The first tubular element 309 is located adjacent the second lateral wall 64 near the wire containment area 111 and has an outside surface that serves as the bearing surface for the first end of the chamber rotation axis 308. The first tubular element 309 is also provided with an inner bore 311 (see FIG.

18) that provides a path for the electrical wires to pass from the enclosure 301 to the wire containment area 111 of the base 20.

The second tubular element 312 is located adjacent the first lateral wall 63 near the entry opening 306. The outside surface of the second tubular element 312 serves as the bearing surface at the second end of the chamber rotation axis 308. A D-shaped hole or bore 315 in the second tubular element 312 accepts a correspondingly shaped output shaft 507 from the gear motor 505 (see FIG. 12) in order to transmit torque from the shaft 507 to the chamber assembly 60 so that the chamber assembly rotates when the gear motor output shaft turns, as will be described more fully hereinafter.

The chamber assembly 60 further includes the motor support bracket 330, having a mounting plate 331 and a U-shaped support member 332. Each side of the mounting plate 331 has a slot 333 formed therein to receive a respective one of the two mounting arms 19 that project upwardly from the base wall 106. The U-shaped support member 332 has a semi-circular support surface 334 to receive the correspondingly shaped outer surface of a mounting adapter 501 (see FIG. 12) on the gear motor 505. The cylindrical inner surface 335 of the mounting plate 331 in turn receives semi-circular flanges 521 on the power-driven rotating assembly 70 (see FIG. 12).

Figure 12:
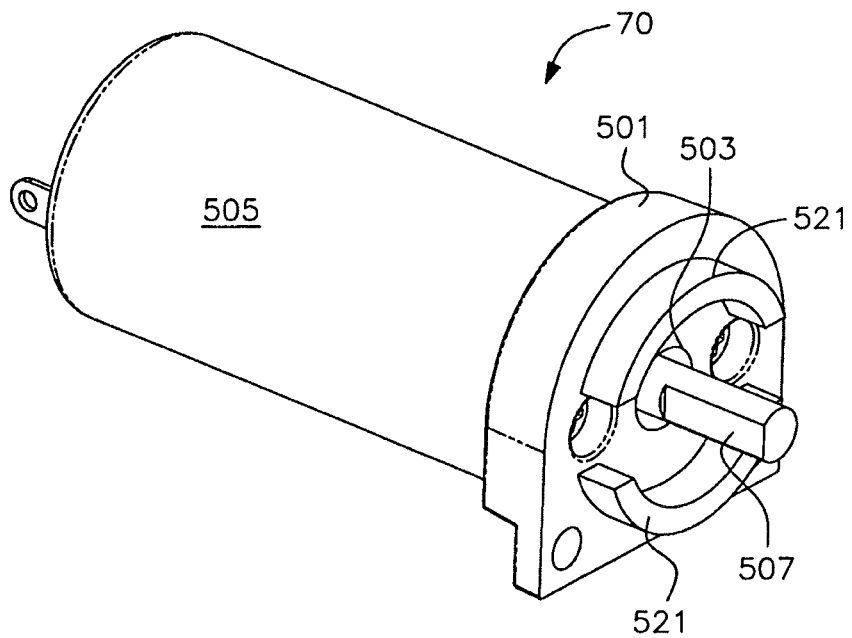
FIG. 12 is an enlarged perspective view of the power-driven rotating assembly shown in FIG. 4, but shown at a slightly different perspective.

The preferred power-driven rotating assembly 70, shown in FIG. 12 (note that FIG. 12 shows the power-driven rotating assembly rotated 180 degrees with respect to the killing chamber assembly 60 as shown in FIG. 11), includes the gear motor 505 mounted on a mounting adapter 501 that has a hole 503 through which the gear motor output shaft 507 freely passes. As previously noted, the mounting adapter 501 is provided with semi-circular flanges 521 by which the adapter 501 is supported on the inner surface 335 of the mounting plate 331. The power-driven rotating assembly 70 acts as a chamber clearing mechanism that is automatically activated upon the killing of a mouse, as will be described hereinafter.

The home and dump switches 80, 160 are closed through respective contact engagement with the home and dump position stop elements 171, 170. Upon powering up of the trap, the chamber assembly 60 seeks the home position if the home position stop element 171 is not already engaged.

Figure 13A:
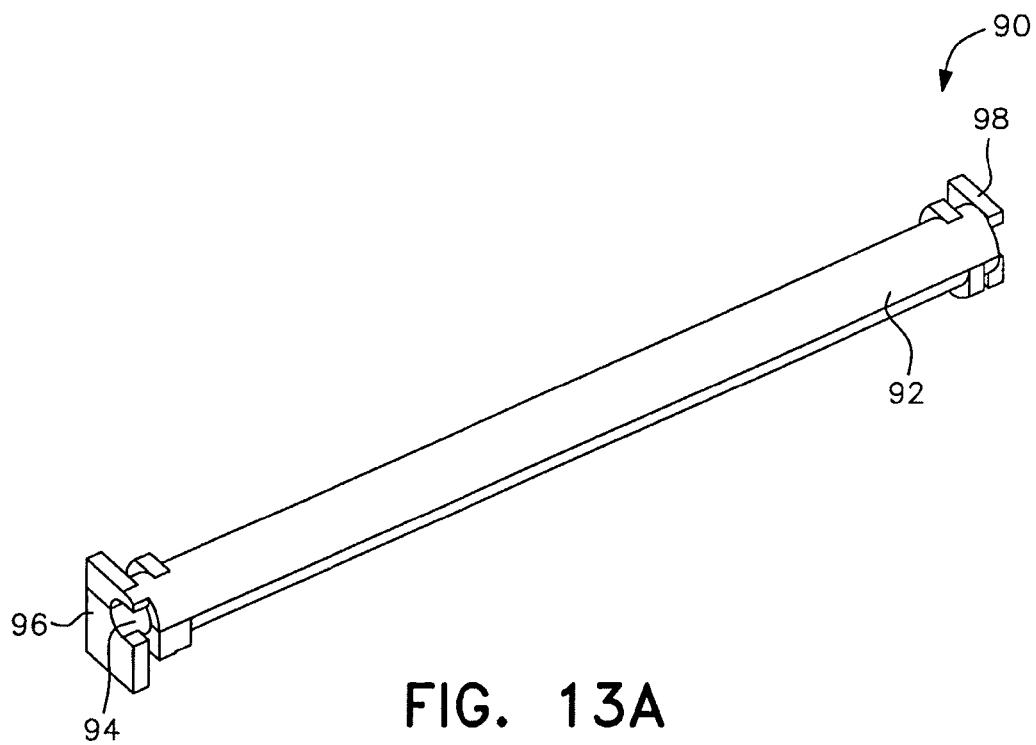
FIGS. 13A and 13B are enlarged perspective and end views, respectively, of the wire guide shown in FIG. 4.
Figure 13B:
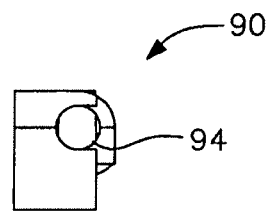
Figure 15A:
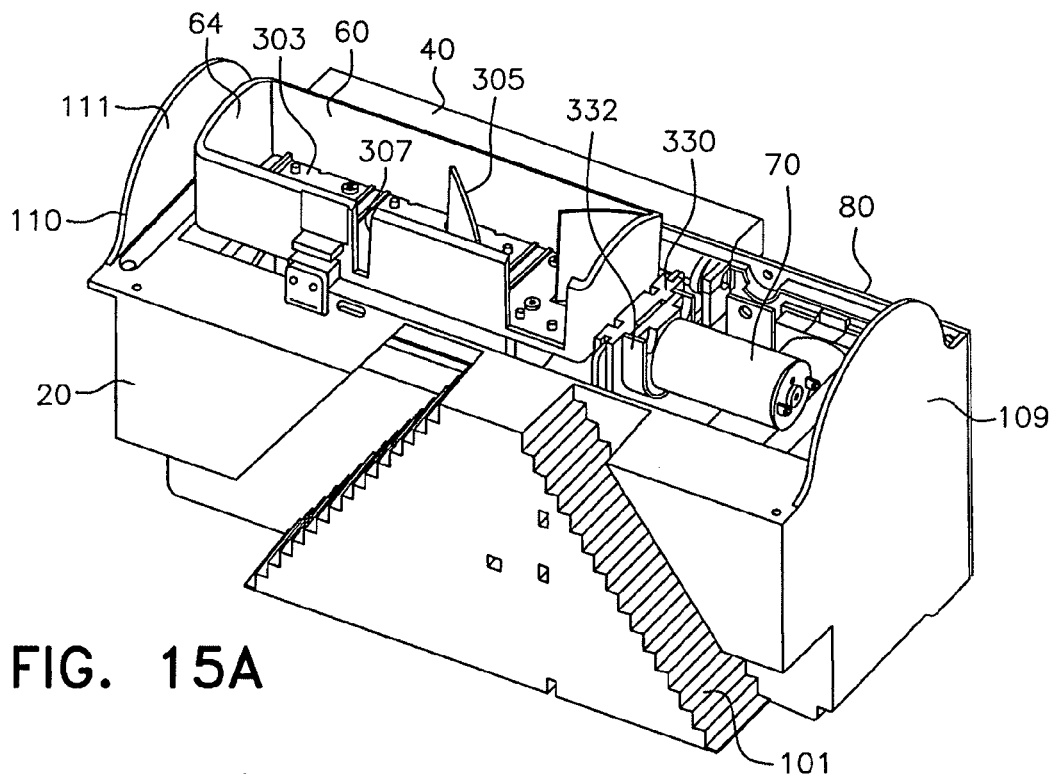
FIGS. 15A through 15F are rear perspective views of the trap as shown in FIG. 3, illustrating the dump sequence of the killing chamber.
Figure 15B:
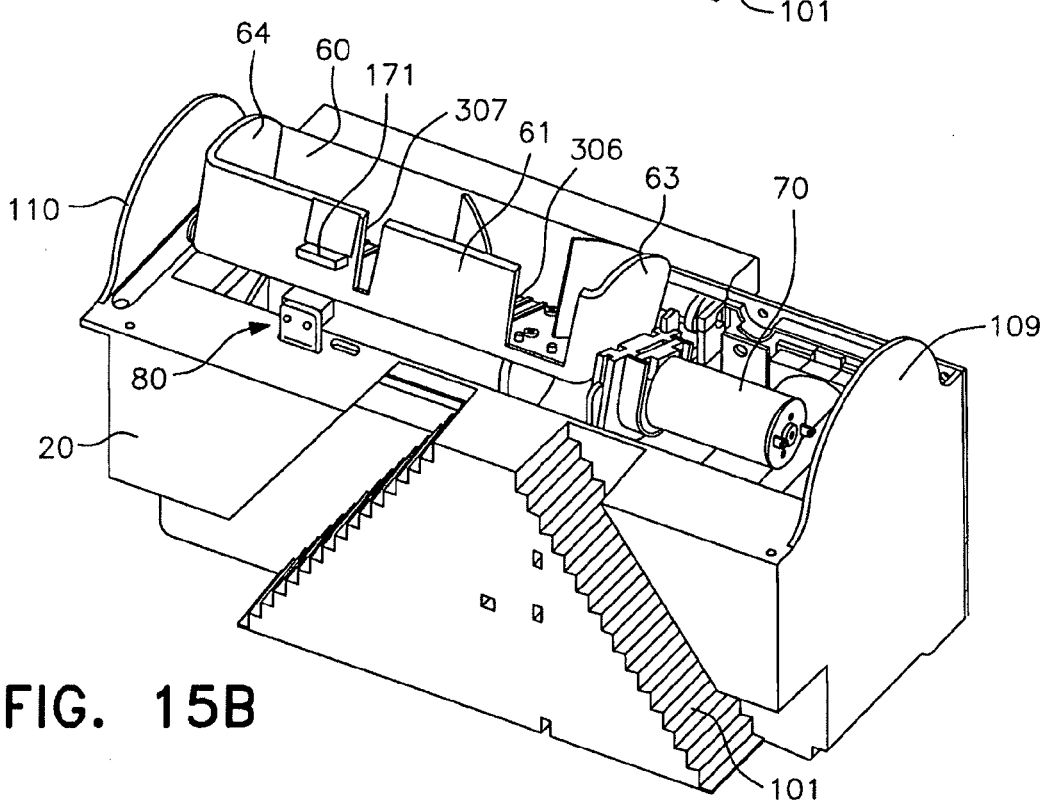
Figure 15C:
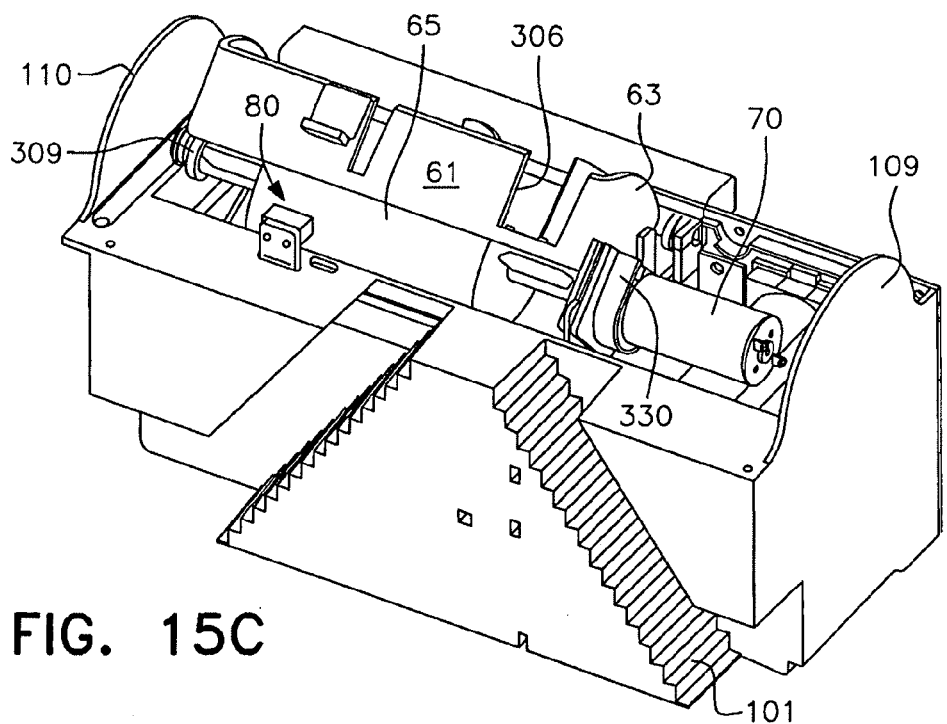
Figure 15D:
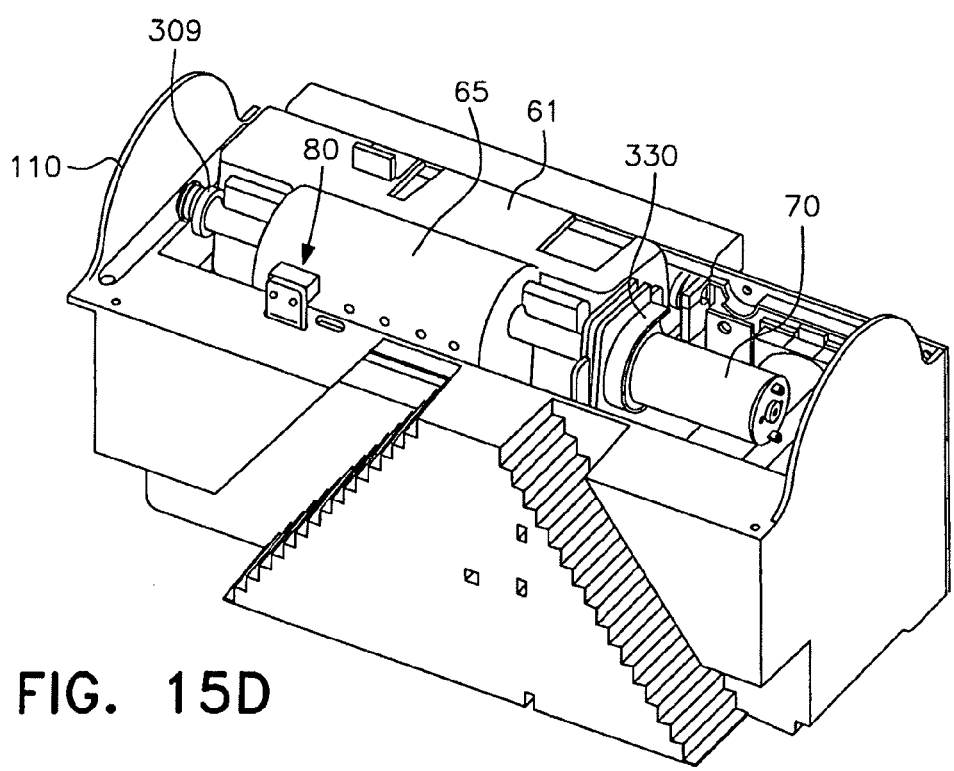
Figure 15E:
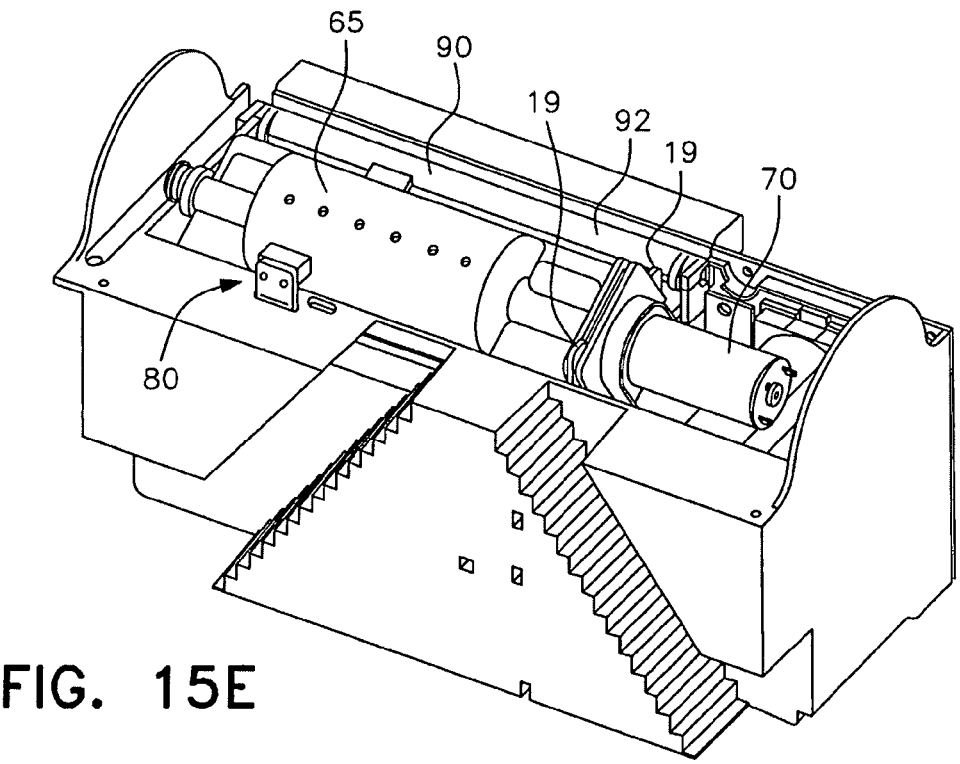
Figure 15F:
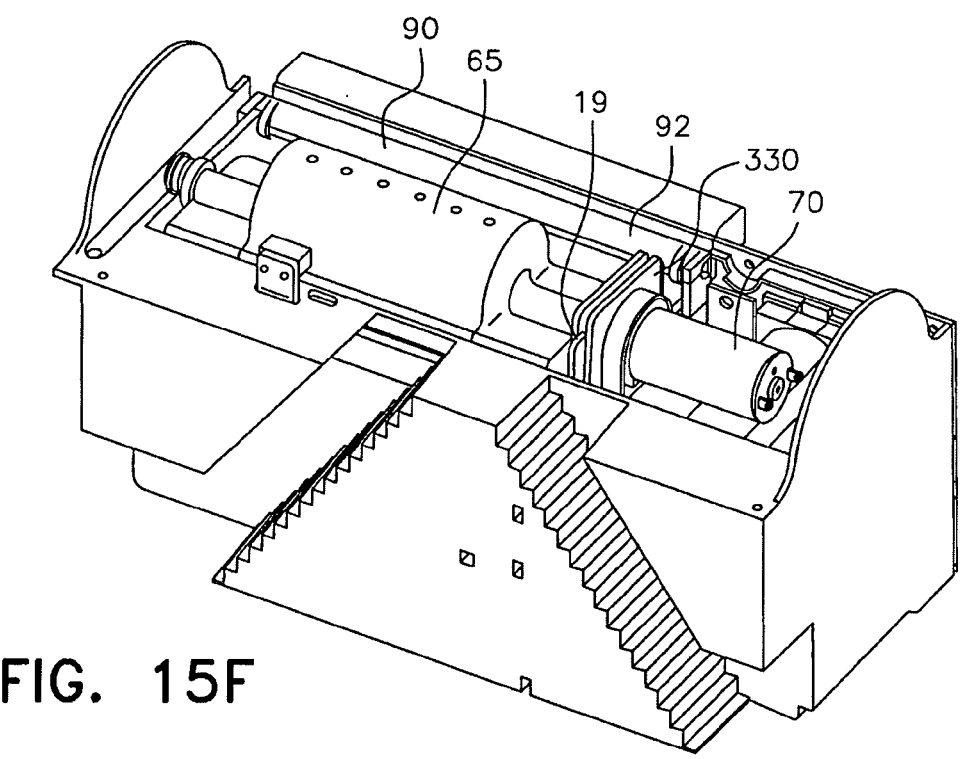
Figure 16A:
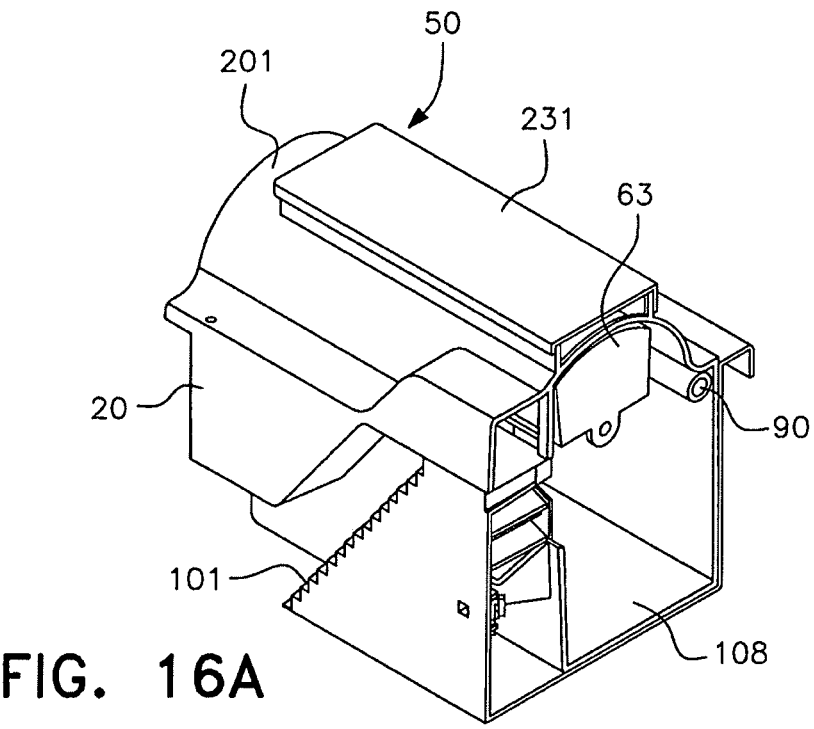
FIGS. 16A through 16E are sectional perspective views of the trap of FIG. 1 going through a dump sequence.
Figure 16B:
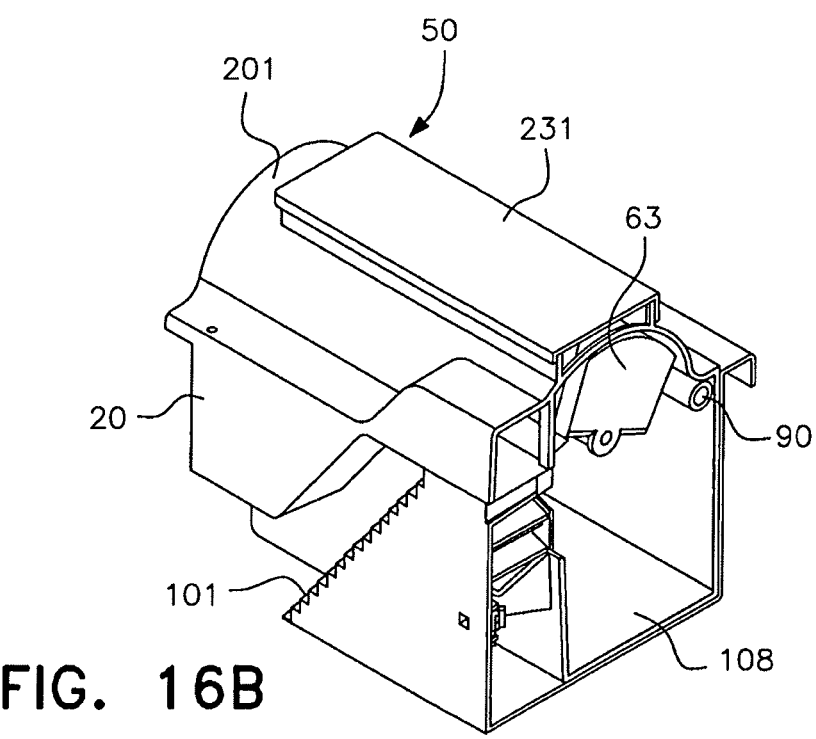
Figure 16C:
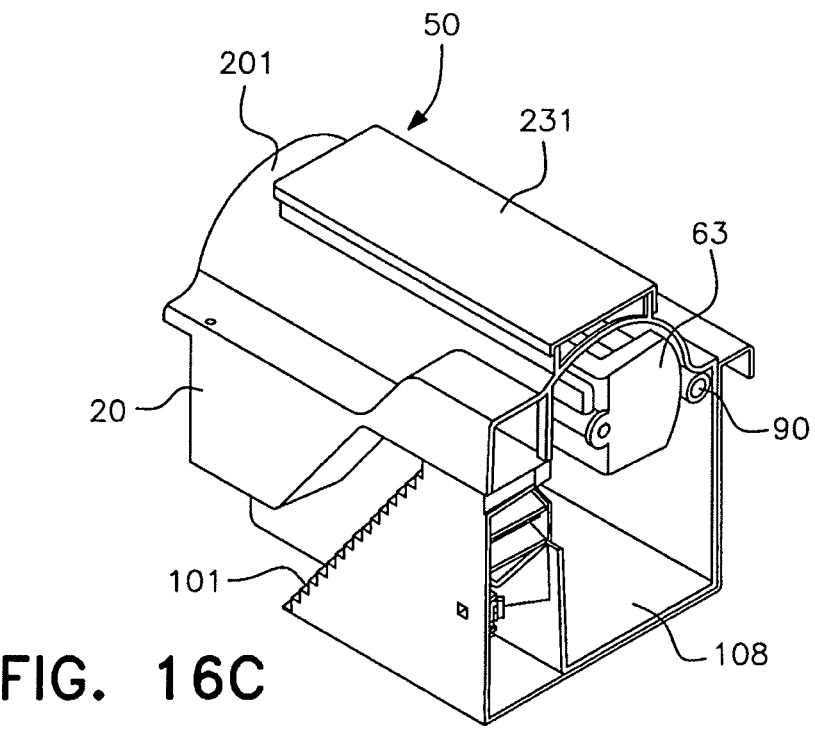
Figure 16D:
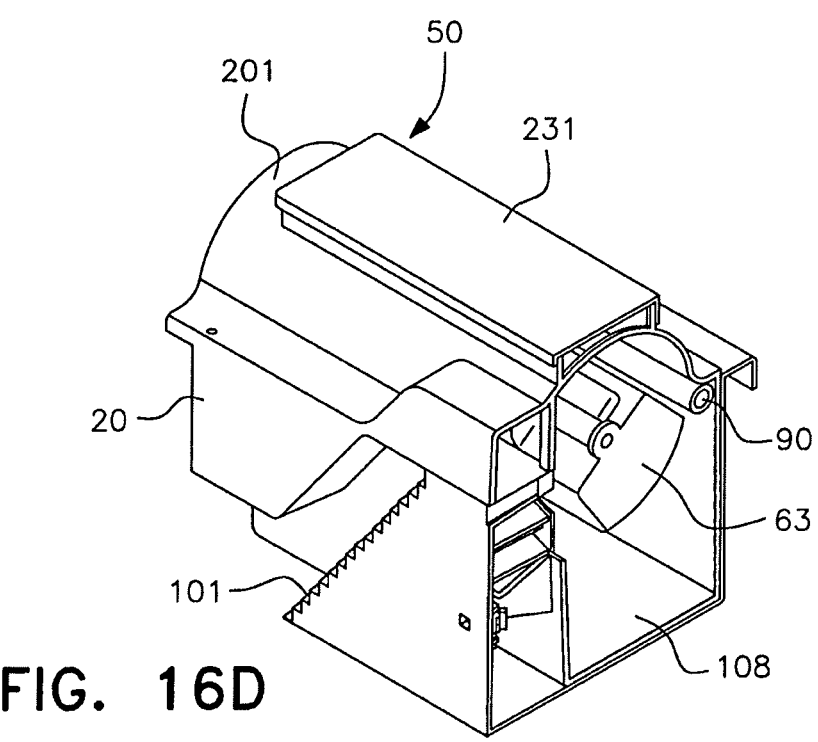
Figure 16E:
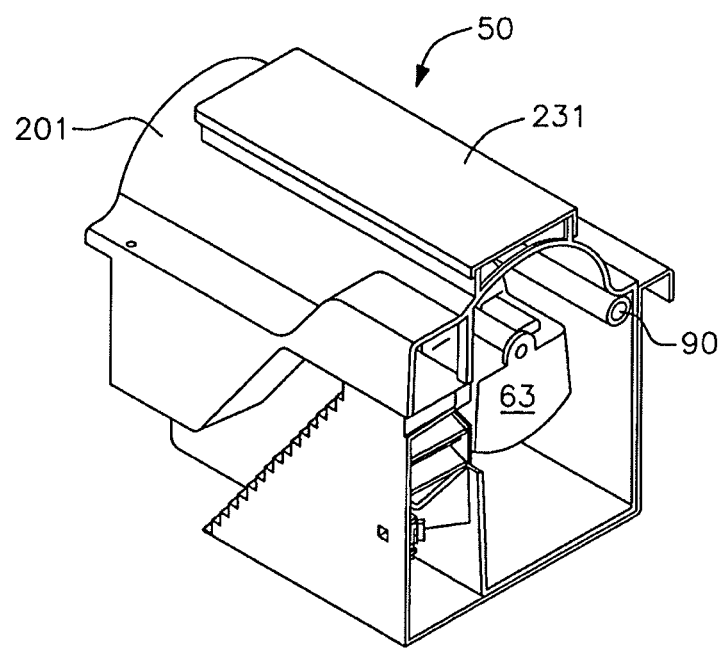

The wire guide, generally designated by the reference numeral 90, is shown in detail in FIGS. 13A and 13B and is used to route the wires that supply current to the transformer 304 from the wire containment area 111 to the electronics and motor area 107. The wire guide 90 includes a generally tubular member 92 having a longitudinally running channel 94 passing through its length for containing and protecting the wires. Mounting elements 96 and 98 at each end of the tubular member 92 are provided to mount the wire guide 90 to the front sides of the internal wall 106 and second side wall 104, respectively, of the base 20 (see FIGS. 15E and 15F).

To assemble the trap 10, the home and dump switches 80, 160 and the bin-in-place safety switch 180 are mounted to the base first, followed by the chamber assembly 60. Wires for supplying current to the transformer 304 are routed from the wire containment area 111 through the channel 94 in the tubular member 92 of the wire guide 90 and into the electronics and motor area 107. The wire guide is then mounted to the base, and the circuit board and the power supply are inserted. Lastly, the roof assembly is secured in place, including attachment of the wiring connecting the circuit board to the door safety switch 243.

When assembled, the second tubular element 312 is supported by a plain bearing 317 resting on an inner surface (not shown) of the mounting plate 331. The first tubular element 309 is supported on the concave bearing surface 203 of wall 202.

The roof assembly 50 is aligned with the base 20 such that the second wall 104 and the internal wall 106 of the base and the roof walls 202, 204 are respectively aligned and in abutment with one another. The half-cylindrical bearing surfaces 203 and 105 of the roof and the base, respectively, with plain bearing 319, thereby form a full-cylindrical bearing area for the first tubular element 309 of the chamber assembly.

After assembly, the wire containment area 111 is essentially enclosed on all six sides, and the bin area and electronics and motor area are essentially enclosed on five sides, with the open sides 31 and 82, respectively, being uncovered until the power source assembly 30 and collecting bin 40 are in place. The wire guide 90 is held in place by mounting fixtures on the base and/or roof assembly in any suitable manner.

As already discussed, the power source assembly 30 is installed and fastened to cover the open side 31 of the electronics and motor area 107 using conventional fastening elements. The collecting bin 40 is installed by sliding the bin 801 into the open side 82 of the bin area 108 under the chamber assembly 60 with the handle exposed toward the outside of the trap and the open side 42 of the bin 801 facing the bottom of the chamber assembly. As already discussed, the bin can be removed or installed with the chamber in any position because the bin-in-place safety switch 180 disables the trap if the bin is not in place, protecting the user from contact with the killing plates in a charged condition.

The precise wiring, controls and control logic can be variously undertaken to effect the desired rotation of the chamber assembly as would be understood by persons of ordinary skill in the art. According to a preferred embodiment, the chamber assembly 60 is turned upside-down to the dump position by applying voltage of appropriate polarity to the gear motor 505. Reversing the motion and returning the chamber to the home position is accomplished by applying voltage of opposite polarity. The rotation angle is approximately 180 degrees from the upright to inverted positions. The chamber preferably reverses directions rather than continuing in the same direction to reset for two reasons. Firstly, the device can be made smaller if clearance is not required for the chamber to complete a full rotation. Secondly, the electrocuting plates can be connected to the control circuitry via inexpensive wires. These wires would gradually "wind up" and be damaged if complete rotation cycles were repeated.

Figure 7A:
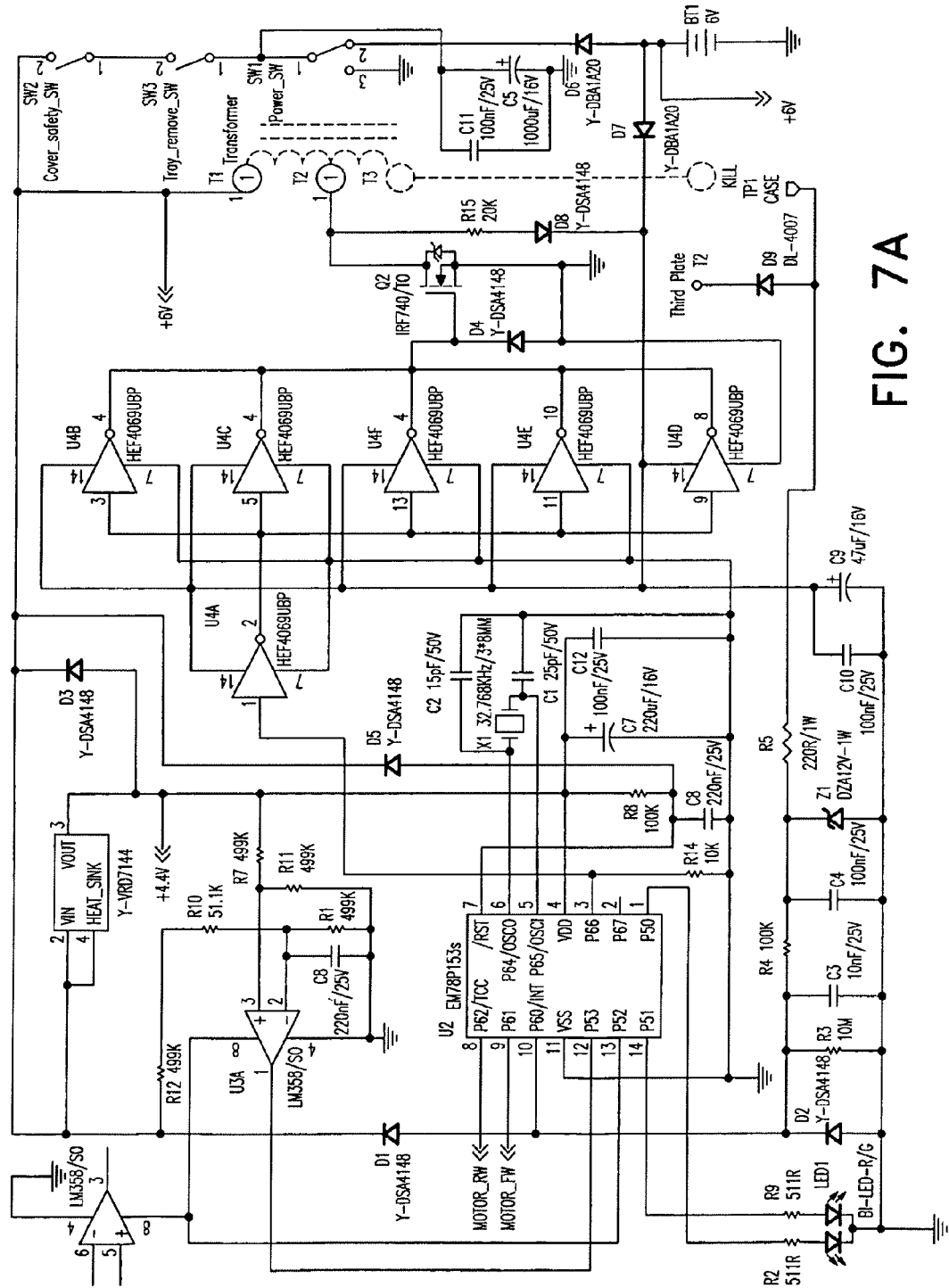
FIGS. 7A and 7B are schematic illustrations of an electronic circuit with automatic dump sequence in accordance with the present invention.
Figure 7B:
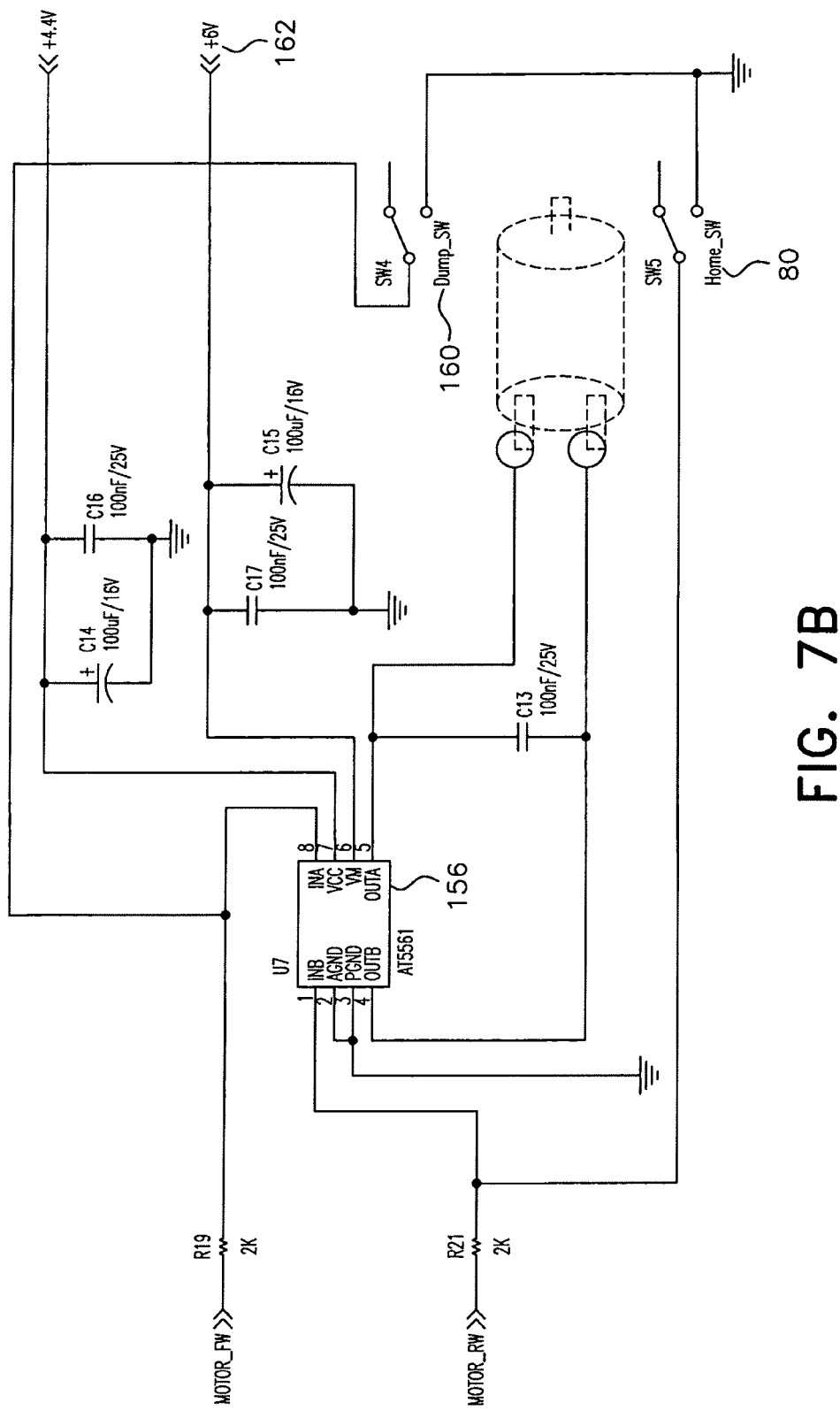
Figure 14A:
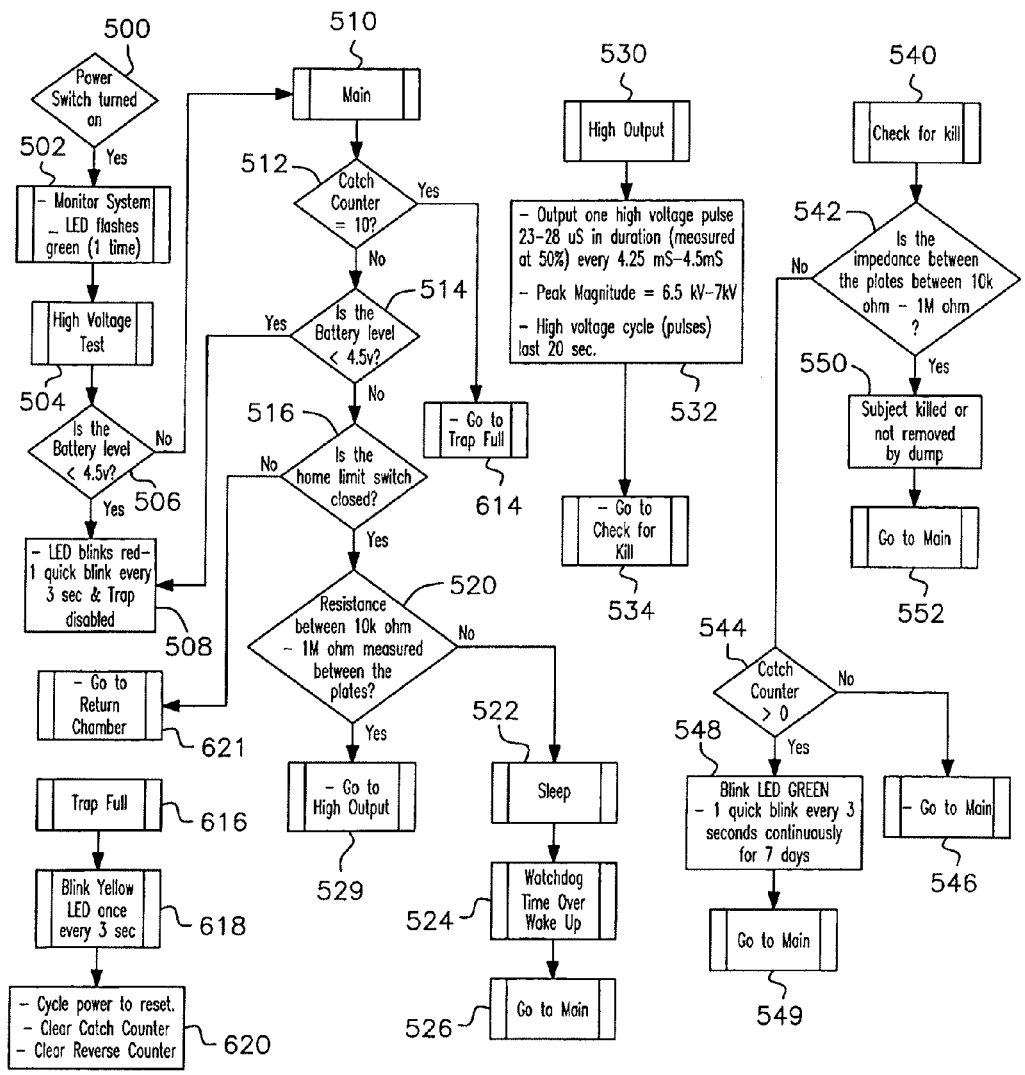
FIGS. 14A and 14B present a flowchart of an electronic circuit with automatic dump sequence in accordance with the present invention.
Figure 14B:
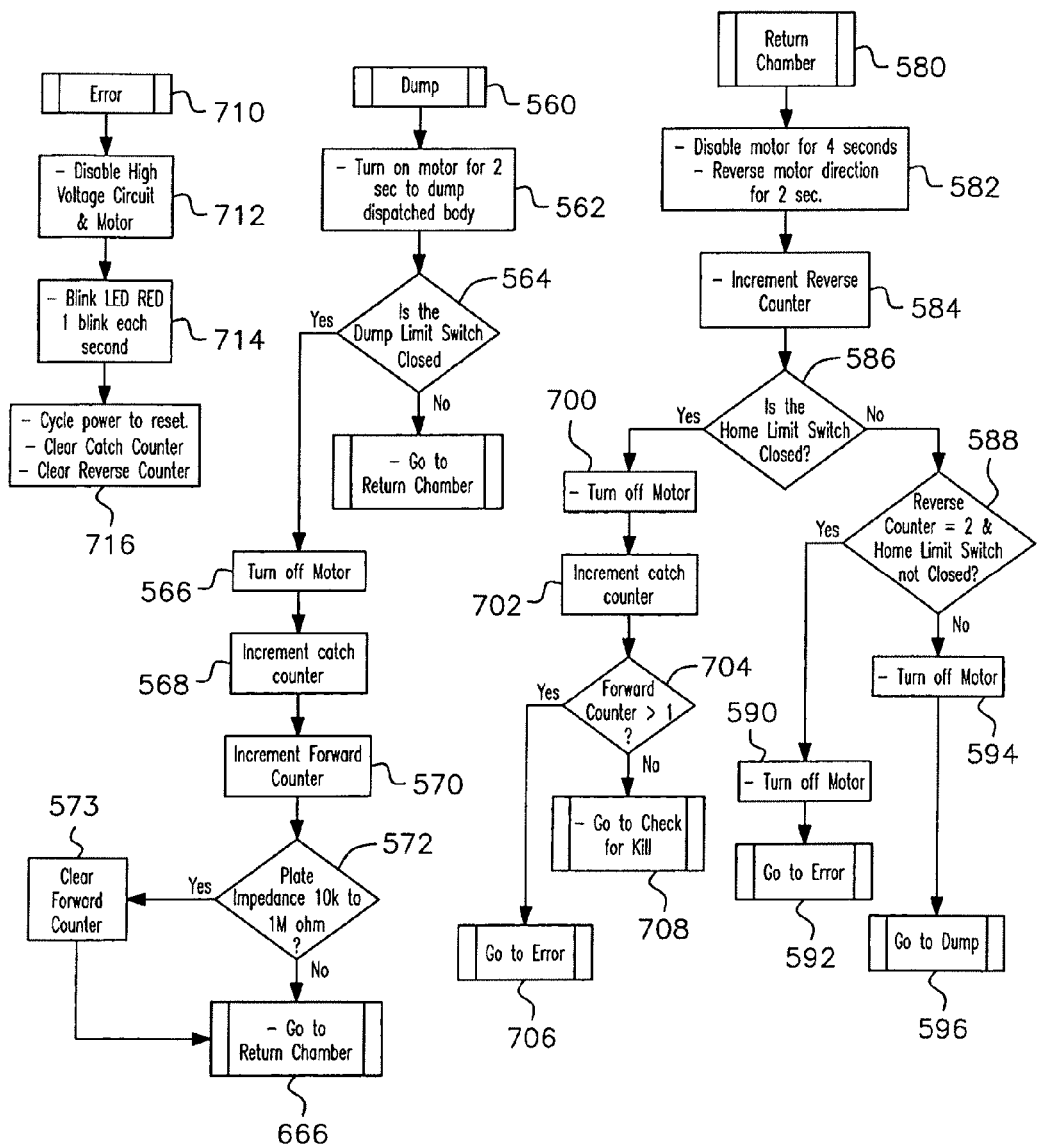

In brief, as implemented in the circuit set forth in FIGS. 7A and 7B and summarized in the flowchart of FIGS. 14A and 14B, trap operation is initiated by turning on the power switch, step 500. The monitor system LED flashes green, step 502, followed by a high voltage test, step 504. If the battery level is determined to be less than 4.5 volts, step 506, the LED blinks red on a predetermined basis, for example one blink every three seconds, and the trap is disabled, step 508.

If the battery level is at least 4.5 volts, step 506, the trap enters the main operating sequence, step 510. As an initial procedure thereafter, a catch counter which tracks the number of catches is checked to see whether the total number of catches is equal to ten, step 512. If the catch counter is equal to ten, the trap is considered full and the trap full subsequence is entered, step 614.

Upon entry to the trap full subsequence, step 616, the yellow LED is activated to flash on a predetermined basis, step 618, such as one blink every three seconds. The power to the trap must then be cycled to reset the trap. Resetting the trap clears the catch counter and clears the reverse counter, step 620.

When the catch counter is not equal to ten, step 512, the battery level is checked, step 514. If the battery level is less than 4.5 volts, the LED blinks red on a predetermined basis, for example one blink every three seconds, and the trap is disabled, step 508.

If the battery level is at least 4.5 volts, step 514, the trap checks whether the home limit switch is closed, step 516. If the home limit switch is not closed, the return chamber subsequence is entered, step 621, which is described hereinafter. If the home limit switch is closed, step 516, the trap checks to see whether a predetermined resistance of from 10K ohm to 1M ohm is measured across the killing plates, step 520. This level or target range of resistance is known to correspond with the impedance level resulting from the body of mouse across the plates.

If the resistance between the plates is measured to be within the target range, the trap goes to the high output subsequence, step 529. If this level of resistance is not sensed, however, the trap goes to sleep, step 522. After a predetermined time, the trap wakes up, step 524, and returns, step 526, to the main operating sequence, step 510.

Upon entry to the high output subsequence, step 530, the trap generates a high voltage killing cycle, step 532. According to a preferred embodiment, the high voltage cycle includes the generation of high voltage pulses having a peak magnitude of from about 4 kB to about 7 kV, and more preferably from about 6.5 kV to about 7 kV, and a duration of from about 23 usec to about 28 usec at intervals of about every 4.25 msec to about 4.5 msec for at least about 20 seconds. Upon completion of the killing cycle, the trap enters the check for kill subsequence, step 534.

Upon entry to the check for kill subsequence, step 540, the trap again checks to see whether there is an impedance between the killing plates in the range of about 10 k ohm to about 1M ohm, step 542. The absence of such an impedance indicates that the mouse escaped. In this event, the catch counter is checked to see whether it has a value greater than zero, step 544. If not, the trap returns, step 546, directly to the main operating sequence, step 510. If the catch counter does have a value greater than zero, step 544, the green LED blinks on a predetermined basis, step 548, such as one blink every three seconds for seven days, and the trap returns, step 549, to the main operating sequence, step 510. The flashing green LED allows the user to monitor the likely presence of dead mice in the trap while the trap is still operational.

If an impedance in the target range is detected, step 542, this indicates the mouse was killed or that a previously killed mouse was not removed from the plates, step 550, following a dump sequence, as will be discussed hereinafter. In this event, the trap enters the chamber-clearing or dump subsequence, step 552.

Upon entry to the chamber-clearing or dump subsequence, step 560, the trap automatically turns the motor on to rotate the killing chamber and dump the dispatched body, step 562. According to a preferred embodiment, the motor is operated for about two seconds to rotate the killing chamber 180 degrees from the home position to the dump position. After two seconds, the trap checks to see whether the dump limit switch is closed, step 564. If not, the trap goes to the return chamber subsequence, step 666.

If the dump limit switch is closed, step 564, the motor is turned off, step 566, and the catch counter is incremented by one, step 568. The forward counter, which tracks the forward rotation of the killing chamber, is also incremented, step 570, to indicate that the chamber has been rotated forwardly from the home position and is now in the dump position. The trap then checks whether an impedance within the target range remains across the plates, step 572. If not, the trap clears the forward counter, step 573, and goes to the return chamber subsequence, step 666. If the impedance does remain across the plates, however, the trap goes directly to the return chamber subsequence, step 666, and the forward counter is not cleared.

Upon entry into the return chamber subsequence, step 580, the motor is disabled and reversed to rotate the killing chamber from the dump position to the home position, step 582. According to a preferred embodiment, the motor is disabled for about 4 seconds and, by applying voltage of opposite polarity, is reversed for about two seconds to rotate the killing chamber 180 degrees back to the home position. After two seconds, the reverse counter is incremented, step 584, to indicate that the chamber has been rotated rearwardly from the dump position and is now back in the home position. The trap then checks to see whether the home limit switch is closed, step 586.

If the home limit switch is not closed, step 586, the trap checks whether the reverse counter is equal to two, step 588. If it is equal to two, this indicates that the trap has already proceeded through the chamber-clearing or dump subsequence twice but the killing chamber is not able, for some reason, to return to the home position. In this situation, the motor is turned off, step 590, and the trap enters an error mode, step 592.

If the reverse counter is not equal to two, i.e., is only one, this indicates that the trap has undergone only one dump subsequence. In this situation, the motor is turned off, step 594, and the trap returns, step 596, to the chamber-clearing or dump subsequence, step 560, for a second time.

If the home limit switch is closed, step 586, the motor is turned off, step 700, and the reverse counter, which tracks the backward rotation of the killing chamber, is reset, step 702, to indicate that the chamber has been rotated rearwardly from the dump position and is now in the home position. The trap then checks whether the forward counter is greater than one, step 704. If it is greater than one, this indicates that the trap has already undertaken two dump subsequences without removing the dead carcass from the killing plates. The trap then enters an error mode, step 706.

If the forward counter is not greater than one, step 704, the trap goes, step 708, to the check for kill subsequence, step 540. As already discussed, the trap then checks for the target impedance and, if present, initiates a dump cycle. If this second dump cycle is successful, the forward counter will be cleared and, after another return chamber subsequence, followed by an impedance check, the trap will return to the main operating sequence. If the second dump subsequence is not successful in removing the carcass, the forward counter will be incremented to two and the trap will enter the error mode following the next return chamber subsequence.

Upon entry into the error mode, step 710, the high voltage circuit and motor are disabled, step 712. The red LED blinks on a predetermined basis, step 714, such as once every second, and the power to the trap must be cycled to reset the trap. Resetting the trap clears the catch counter and clears the reverse counter, step 716.

One advantage of the present invention over alternate methods that might be undertaken to clear the killing chamber is that the chamber-clearing mechanism of the trap as disclosed herein is automatically activated to move a single mouse at a time, regardless of how many mice have been caught since the bin was last emptied. This reduces the energy needed to clear the chamber and helps to ensure reliable and cost-effective operation. Other advantages include easy access to the enclosure for cleaning and, since the chamber assembly is inverted shortly after the mouse has been killed, the time for urine and feces to accumulate on the plates 303 is minimized. Inversion of the chamber assembly also encourages fouling elements to fall away from the plates, further reducing the chances of plate fouling.

In use, a mouse climbs the stairs 101 of the base 20 to enter the enclosure 301 through the entrance 306. Upon contacting both the two spaced electrocuting plates 303a and 303b furthest from the entrance 306, a killing cycle is initiated as described in the '999 patent and the mouse is electrocuted in the enclosure. If a second mouse followed the first mouse in, the second mouse is also electrocuted through automatic activation of the third plate 303c once the killing cycle was initiated as previously described. Upon completion of the killing cycle, the power-driven rotating assembly 70 is automatically activated to initiate a chamber-clearing dump sequence during which the chamber assembly is first rotated to an upside-down orientation to allow the mouse to fall from the enclosure by gravity into the bin 801 below the chamber assembly. The power-driven rotating assembly 70 then reverses to return the chamber assembly 60 to its upright position and complete the dump sequence.

FIGS. 15A through 15F are perspective views from the rear of the trap, without the roof assembly, illustrating the dump sequence of the chamber assembly. It is noted that while FIGS. 15B-15F show the bracket 330 rotating with the chamber assembly, in fact the bracket 330 does not rotate but remains in the position shown in FIG. 15A throughout the dump sequence. Hence, the chamber assembly rotates on bearing surfaces defined by the outer surface of the first tubular element 309 and plain bearing 319 in concave bearing surface 203, and the outer surface of tubular element 312 and plain bearing 317 as previously disclosed. Sectional perspective and end views of the trap going through a dump sequence are respectively provided in FIGS. 16A through 16E and FIGS. 17A through 17D.

Figure 18:
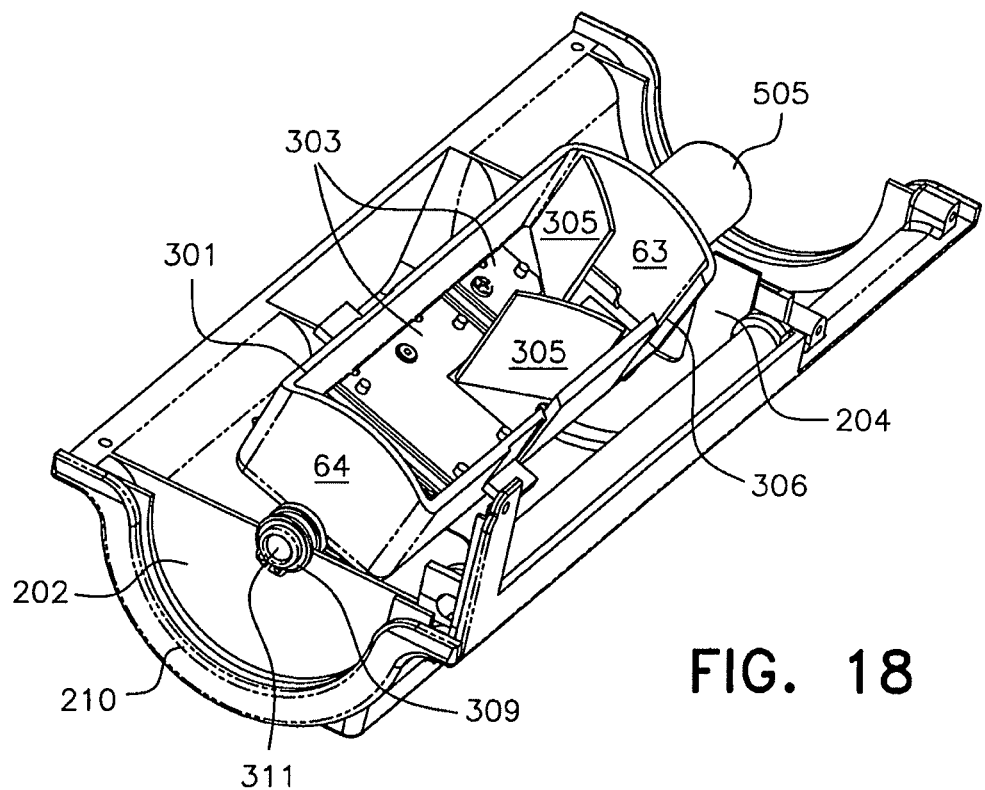
FIG. 18 is a partial perspective view of the underside of the roof assembly with the killing chamber in the dump position.
Figure 17A:
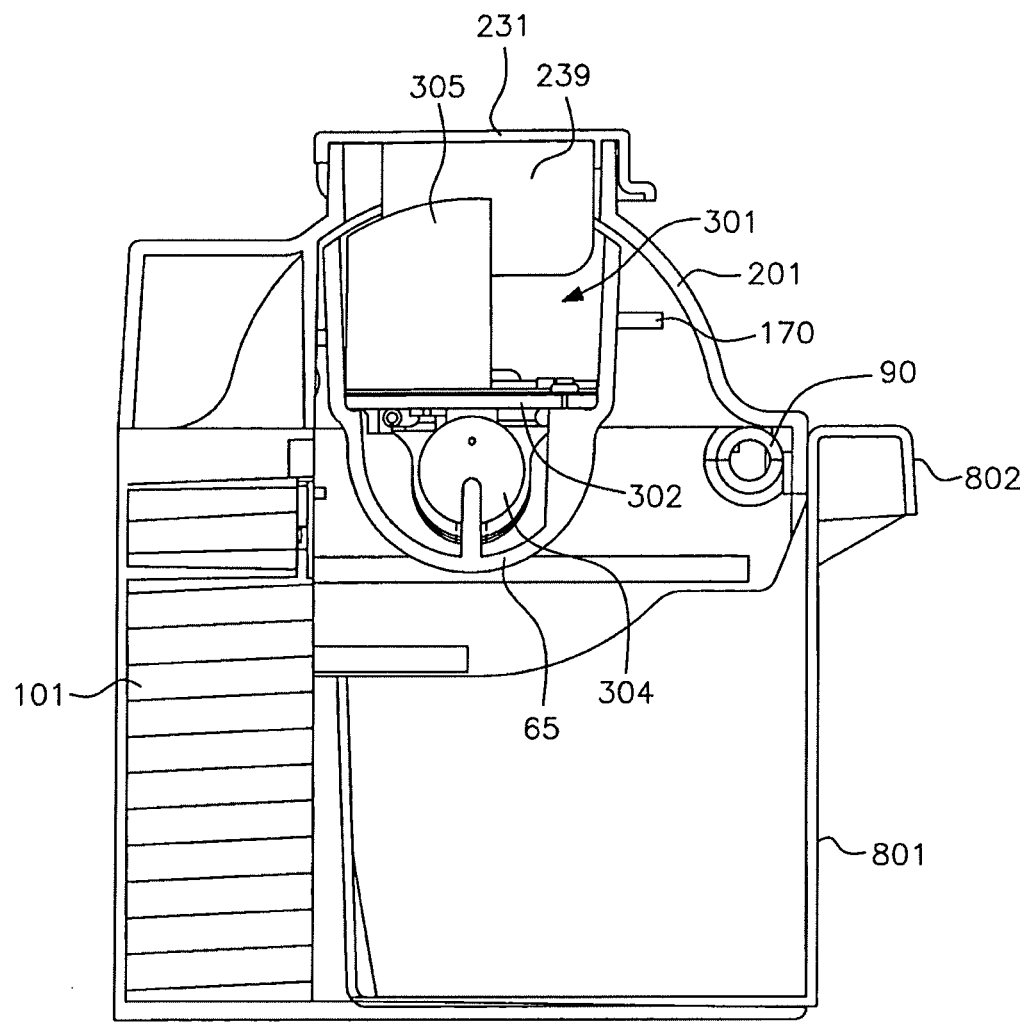
FIGS. 17A through 17D are end perspective views of the trap of FIG. 1 going through a dump sequence.
Figure 17B:
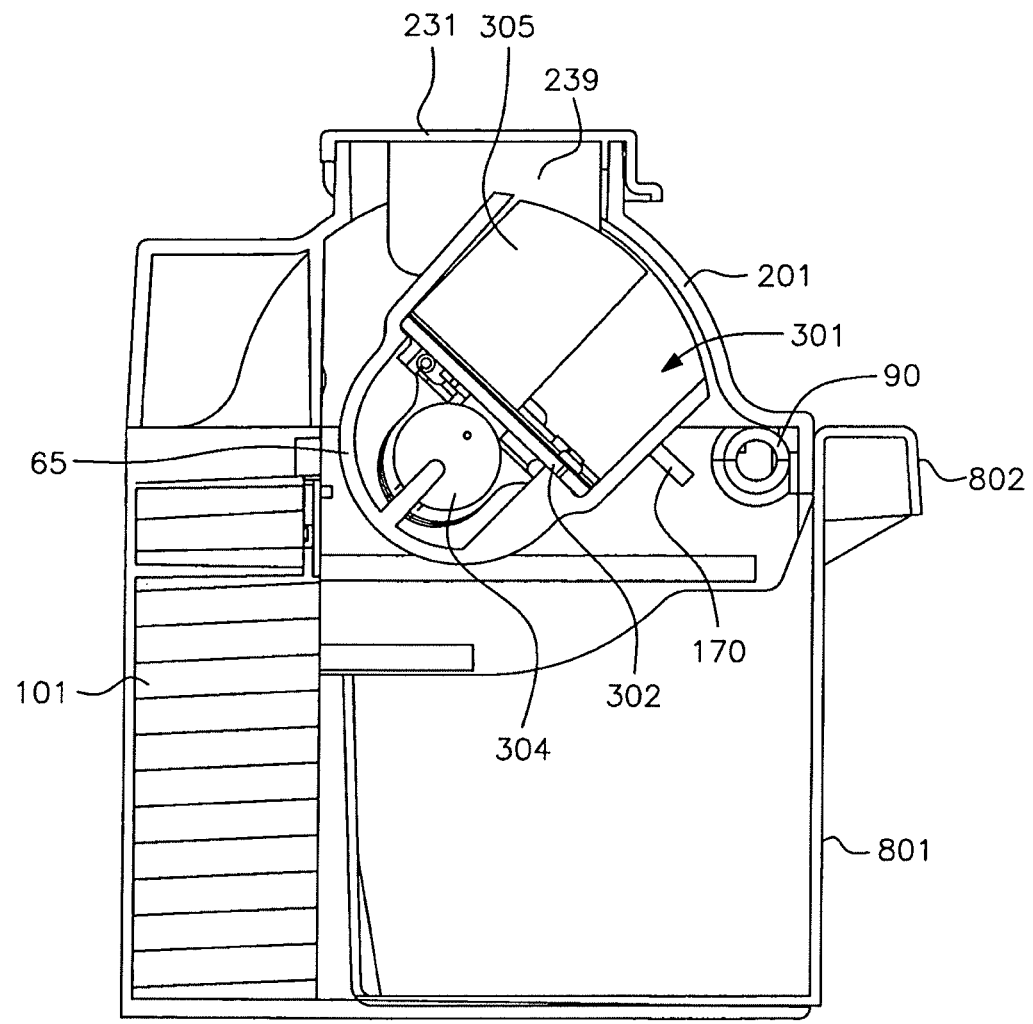
Figure 17C:
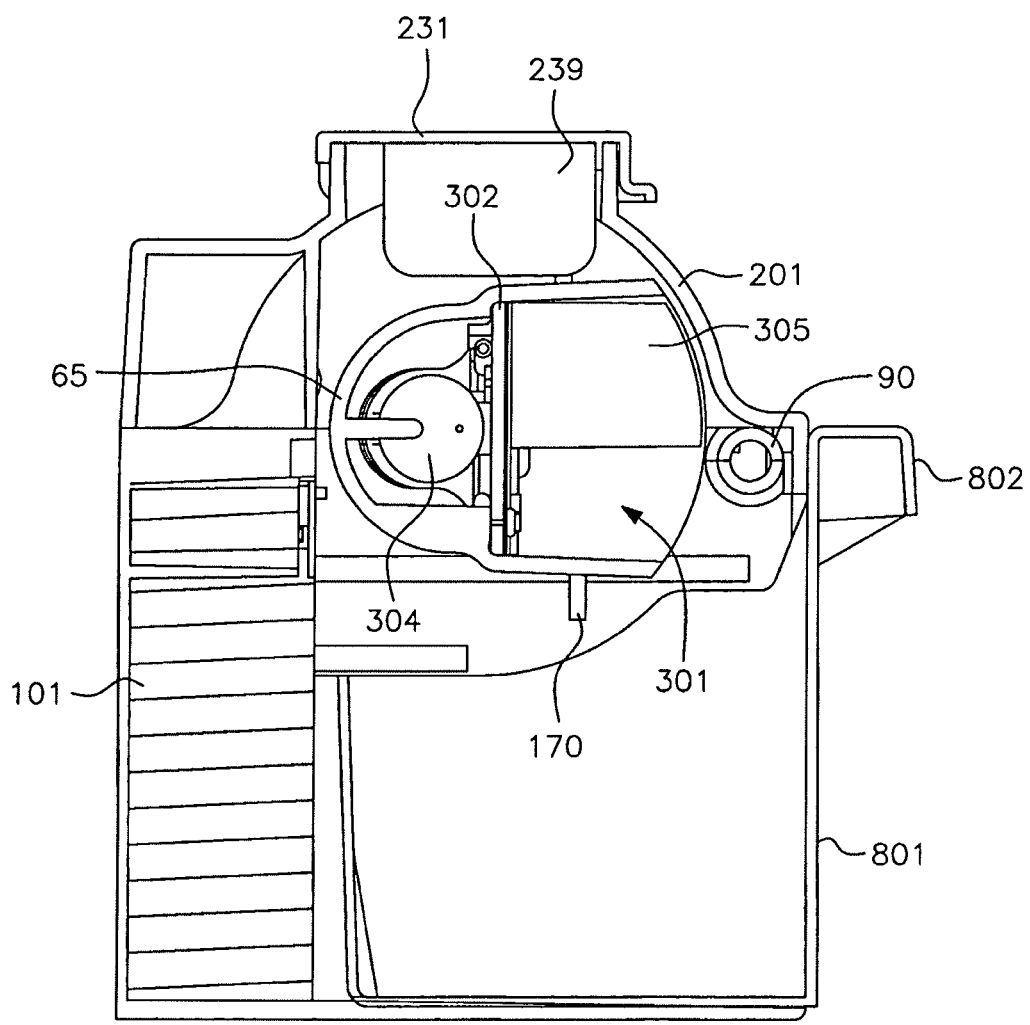
Figure 17D:
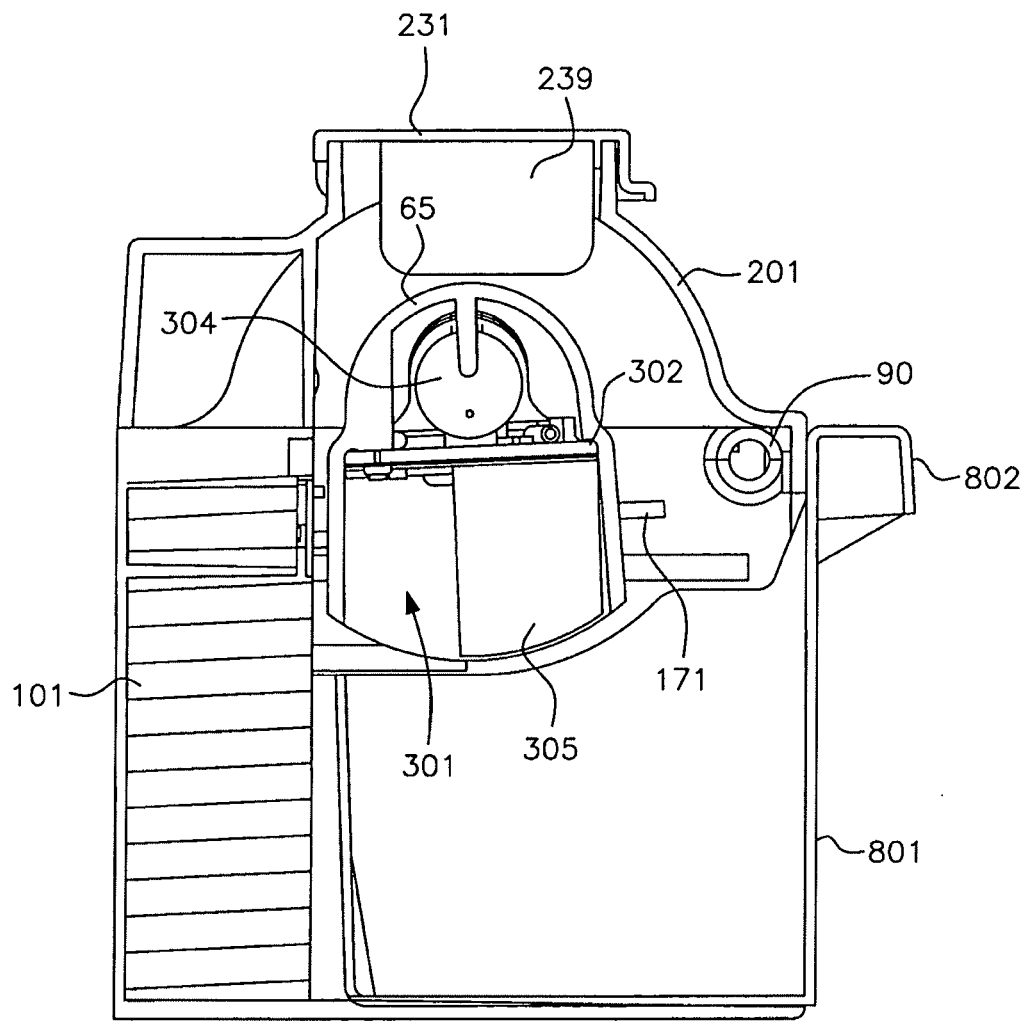

The underside of the roof assembly with the chamber assembly in the dump position is illustrated in FIG. 18.

While the chamber clearing mechanism has been fully described only in connection with the embodiment of the power-driven rotating assembly 70, other embodiments of the chamber clearing mechanism are also contemplated. For example, instead of rotating the killing chamber, the chamber clearing mechanism could be embodied to include a trap door in the floor of the killing chamber that would be electrically or magnetically controlled to swing downwardly to allow the dead mouse to drop into the collecting bin below the killing chamber. As another example, the killing chamber and the collecting bin could be arranged side-by-side as opposed to one on top of the other, with a swingable dividing wall separating the two. Following activation of the high voltage circuit and the killing of a mouse, a chamber clearing mechanism coupled to the dividing wall and including a sweeping element could be automatically activated to swing the bottom of the wall toward or away from the killing chamber with the sweeping element then moving horizontally across the floor of the killing chamber to push the dead body over to the collecting bin. If the killing chamber and collecting bin floors are substantially even, the trap could be made without stairs for entry. In this case, the dividing wall would preferably swing toward the killing chamber to prevent interference between the wall and any dead mice already pushed into the collecting bin. However, if the staired approach of the invention as described herein were maintained, the floor of the collecting bin would be lower than the killing chamber floor. This two-level configuration would allow the dividing wall to swing either direction and enable a greater number of mice to be collected, just as in the preferred embodiment fully set forth herein.

Accordingly, the present invention is also directed to a method of electrocuting and collecting multiple mice with a trap having a killing chamber with electrocuting plates, a high voltage output circuit, an automatic chamber clearing mechanism and a collection area. The method includes the steps of sensing a mouse on the electrocuting plates and, in response thereto, activating the high voltage output circuit for a specified killing cycle during which high voltage is directed to the electrocuting plates. Upon completion of the killing cycle, the method includes sensing the continued presence of a mouse in the killing chamber as representative of a dead mouse, in response to which the chamber clearing mechanism is automatically activated to transfer the dead mouse from the killing chamber into the collection area. Following transfer of the dead mouse, the chamber clearing mechanism automatically returns to a home position for a next mouse. The method steps can be repeated on an automated basis for multiple mice without any manual resetting of the trap being required.

The foregoing descriptions and drawings should be considered as illustrative only of the principles of the invention. The invention may be configured in a variety of shapes and sizes and is not limited by the dimensions or configuration of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. An electronic mouse trap for electrocuting and collecting multiple mice comprising:
    a collection area configured to contain one or more dead mice;
    a chamber assembly having a killing chamber that is positioned adjacent the collection area, said chamber assembly including a floor having electrocuting plates, said chamber assembly when in a home position providing a mouse with access to said killing chamber and initiating a killing cycle by activating said electrocuting plates when a mouse is sensed in said killing chamber, said chamber assembly remaining stationary in the home position during said killing cycle and said mouse remaining on said floor throughout a duration of the killing cycle; and
    a power-driven chamber clearing mechanism configured, upon completion of the killing cycle and killing of a mouse, to automatically activate to clear the mouse from said chamber assembly and deposit the mouse into the collection area, said power-driven chamber clearing mechanism subsequently returning said chamber assembly to the home position for a next mouse.

2. The trap as set forth in claim 1, wherein said collection area is part of a base and further comprising a roof assembly mounted to the base, said chamber assembly being rotatably mounted between the roof assembly and the base, said roof assembly including an entrance area communicating with the killing chamber.

3. The trap as set forth in claim 2, wherein said collection area is located under said killing chamber.

4. The trap as set forth in claim 2, wherein said chamber assembly is elevated and said roof assembly includes an inclined pathway to provide a mouse with access to the entrance area.

5. The trap as set forth in claim 1, wherein said power-driven chamber clearing mechanism moves in one direction to clear the killing chamber and then moves in the opposite direction to return said chamber assembly to the home position.

6. The trap as set forth in claim 5, wherein said power-driven chamber clearing mechanism receives input from limit switches that define a range of motion for said chamber clearing mechanism.

7. The trap as set forth in claim 1, wherein said collection area is positioned below said killing chamber and is fitted with a collection bin having an open top that collects dead mice deposited therein by said chamber clearing mechanism, said bin sized to collect a plurality of mice.

8. The trap as set forth in claim 1, wherein said killing chamber is rotatable and said power-driven chamber clearing mechanism rotates said killing chamber in one direction to clear the killing chamber and then rotates said killing chamber in the opposite direction to return said chamber assembly to the home position.

9. The trap as set forth in claim 1, wherein said electrocuting plates include two plates that act to activate the trap and a third plate that does not contribute to activation but does conduct high voltage once the trap is activated.

10. An electronic mouse trap for electrocuting and collecting multiple mice comprising:
a housing having a killing chamber and a collection area, said killing chamber including electrocuting plates and an entrance that provides a mouse with access to an interior of said killing chamber;
a power source associated with said housing to activate said plates for a specified killing cycle, said killing chamber remaining stationary during said specified killing cycle and said mouse remaining on said floor throughout a duration of the specified killing cycle;
a power-driven chamber clearing mechanism being automatically activated upon completion of the killing cycle to initiate a clearing sequence to transfer any dead pest from the killing chamber to said collection area; and
said entrance to said killing chamber providing a next mouse with access to said killing chamber upon completion of said clearing sequence.

11. The trap as set forth in claim 10, wherein said power-driven chamber clearing mechanism moves in one direction to transfer the mouse to the collection area and then moves in an opposite direction to enable a next mouse to access the killing chamber through said entrance.

12. The trap as set forth in claim 10, wherein said killing chamber is rotatable and said power-driven chamber clearing mechanism rotates said killing chamber in one direction to clear the killing chamber and then rotates said killing chamber in the opposite direction to return said chamber assembly to the home position.

13. The trap as set forth in claim 12, wherein said collection area is located under said killing chamber.

14. A method of electrocuting and collecting multiple mice comprising:
providing an electronic mouse trap for electrocuting and collecting multiple mice, said mouse trap including a collection area, a chamber assembly having a killing chamber that is positioned adjacent the collection area, said chamber assembly including a floor having electrocuting plates coupled to a high voltage output circuit, said chamber assembly when in a home position providing a mouse with access to said killing chamber and initiating a killing cycle by activating said electrocuting plates when a mouse is sensed in said killing chamber, said chamber assembly remaining stationary in the home position during said killing cycle, and a power-driven chamber clearing mechanism configured, upon completion of the killing cycle and killing of a mouse, to automatically activate to clear the mouse from said chamber assembly and deposit the mouse into the collection area, said power-driven chamber clearing mechanism subsequently returning said chamber assembly to the home position for a next mouse;
sensing a mouse on said electrocuting plates;
activating said high voltage output circuit in response to said sensing for a specified killing cycle during which high voltage is directed to said electrocuting plates, said chamber chamber remaining stationary during said specified killing cycle and said mouse remaining on said floor throughout a duration of the specified killing cycle;
activating said chamber clearing mechanism to initiate a clearing cycle to transfer said dead mouse from said killing chamber into said collection area upon completion of said killing cycle; and
automatically returning said chamber clearing mechanism to a home position for a next mouse.

15. The method as set forth in claim 14, further comprising the step of sensing a continued presence of said mouse as a dead mouse after completion of said killing cycle and before activating said chamber clearing mechanism.

16. The method as set forth in claim 14, further comprising the step of sensing a continued presence of said mouse as a dead mouse after completion of said clearing cycle and, in response to sensing the dead mouse, repeating the chamber clearing cycle.

17. The method as set forth in claim 16, further comprising the step of sensing a continued presence of said mouse as a dead mouse after completion of said second clearing cycle and, in response to sensing the dead mouse after the second clearing cycle, deactivating the trap.

* * * * *